United States Patent
Miyasaka

(10) Patent No.: US 11,427,005 B2
(45) Date of Patent: Aug. 30, 2022

(54) LIQUID ABSORBER

(71) Applicant: SEIKO EPSON CORPORATION, Tokyo (JP)

(72) Inventor: Yoichi Miyasaka, Nagano (JP)

(73) Assignee: Seiko Epson Corporation, Tokyo (JP)

(*) Notice: Subject to any disclaimer, the term of this patent is extended or adjusted under 35 U.S.C. 154(b) by 237 days.

(21) Appl. No.: 16/903,461

(22) Filed: Jun. 17, 2020

(65) Prior Publication Data
US 2020/0398575 A1  Dec. 24, 2020

(30) Foreign Application Priority Data

Jun. 19, 2019  (JP) .............................. JP2019-113536

(51) Int. Cl.
| | |
|---|---|
| *B01D 17/00* | (2006.01) |
| *B41J 2/01* | (2006.01) |
| *B41J 2/17* | (2006.01) |
| *B01D 53/18* | (2006.01) |
| *B41J 2/165* | (2006.01) |
| *B41J 2/055* | (2006.01) |

(52) U.S. Cl.
CPC ............ *B41J 2/1721* (2013.01); *B01D 17/00* (2013.01); *B01D 53/18* (2013.01); *B41J 2/16523* (2013.01); *B41J 2/055* (2013.01); *B41J 2002/1728* (2013.01)

(58) Field of Classification Search
CPC ................................ B41J 2/055; B01D 17/00
See application file for complete search history.

(56) References Cited

U.S. PATENT DOCUMENTS

| | | | | |
|---|---|---|---|---|
| 3,797,666 A | * | 3/1974 | Nakanishi ............ | B01D 17/045 210/DIG. 5 |
| 6,966,640 B2 | * | 11/2005 | Lee ...................... | B41J 2/17506 347/86 |
| 7,976,121 B2 | | 7/2011 | Harada | |
| 2009/0218271 A1 | | 9/2009 | Harada | |

FOREIGN PATENT DOCUMENTS

JP  2009-269208 A  11/2009

* cited by examiner

*Primary Examiner* — Robert A Hopkins
(74) *Attorney, Agent, or Firm* — Global IP Counselors, LLP

(57) ABSTRACT

A liquid absorber including a liquid absorbent body configured to include a small piece aggregate including a plurality of small pieces having a fiber base material containing a fiber and a water absorbent resin, and a container that includes a wall portion defining a storage space accommodating the liquid absorbent body, and a protrusion portion provided to protrude from the wall portion toward the storage space, in which when a minimum separation distance between a tip end of the protrusion portion and a structure different from the protrusion portion is L1, and an average value of a distance between farthest ends of the small piece is L2, $0 < L1/L2 \leq 1.80$ is satisfied.

9 Claims, 12 Drawing Sheets

LIQUID ABSORBER

The present application is based on, and claims priority from JP Application Serial Number 2019-113536, filed Jun. 19, 2019, the disclosure of which is hereby incorporated by reference herein in its entirety.

BACKGROUND

1. Technical Field

The present disclosure relates to a liquid absorber.

2. Related Art

In an ink jet printer, a head cleaning operation is normally performed to prevent a decrease in print quality due to clogging of ink. During this cleaning operation, waste ink is generated. In addition, waste ink is also generated during an ink filling operation after replacement of an ink cartridge. In order to prevent such waste ink from unintentionally adhering to a mechanism or the like inside a printer, an ink jet printer is provided with a waste liquid collector as an ink absorbent body for absorbing the waste ink. Examples of the waste liquid collector include a device illustrated in JP-A-2009-269208.

The waste liquid collector disclosed in JP-A-2009-269208 has an ink absorbent material that absorbs ink, and a container member that stores the ink absorbent material. The ink absorbent material is formed by stacking a plurality of ink absorbent materials and has a block shape as a whole. In addition, the container member is provided with a movement regulation portion for regulating the movement of the ink absorbent material. The movement regulation portion has a columnar shape standing upright from a bottom portion of the container member. Since the movement regulation portion penetrates and holds the block-shaped ink absorbent material, the movement of the ink absorbent material can be regulated and the waste liquid can be stably absorbed.

In addition, it is proposed to use a small piece aggregate having a plurality of small pieces containing a water absorbent substance as an ink absorbent material. By using the small piece aggregate, the permeability of the ink can be increased, and the absorption characteristics can be enhanced as a whole.

However, since the small piece is more easily moved in a storage space than the block-shaped ink absorbent material in the related art, it is difficult for the container member described in JP-A-2009-269208 to regulate the movement of the small piece.

SUMMARY

The present disclosure can be realized in the following aspects.

According to an aspect of the present disclosure, there is provided a liquid absorber including a liquid absorbent body configured to include a small piece aggregate including a plurality of small pieces having a fiber base material containing a fiber and a water absorbent resin; and a container that includes a wall portion defining a storage space accommodating the liquid absorbent body and a protrusion portion provided to protrude from the wall portion toward the storage space, in which $0<L1/L2\leq1.80$, in which L1 is a minimum separation distance between a tip end of the protrusion portion and a structure different from the protrusion portion, and L2 is an average value of a distance between farthest ends of a small piece of the small pieces.

DESCRIPTION OF EXEMPLARY EMBODIMENTS

Hereinafter, a liquid absorber of the present disclosure will be described in detail based on preferred embodiments illustrated in the accompanying drawings.

First Embodiment

Figure 1:
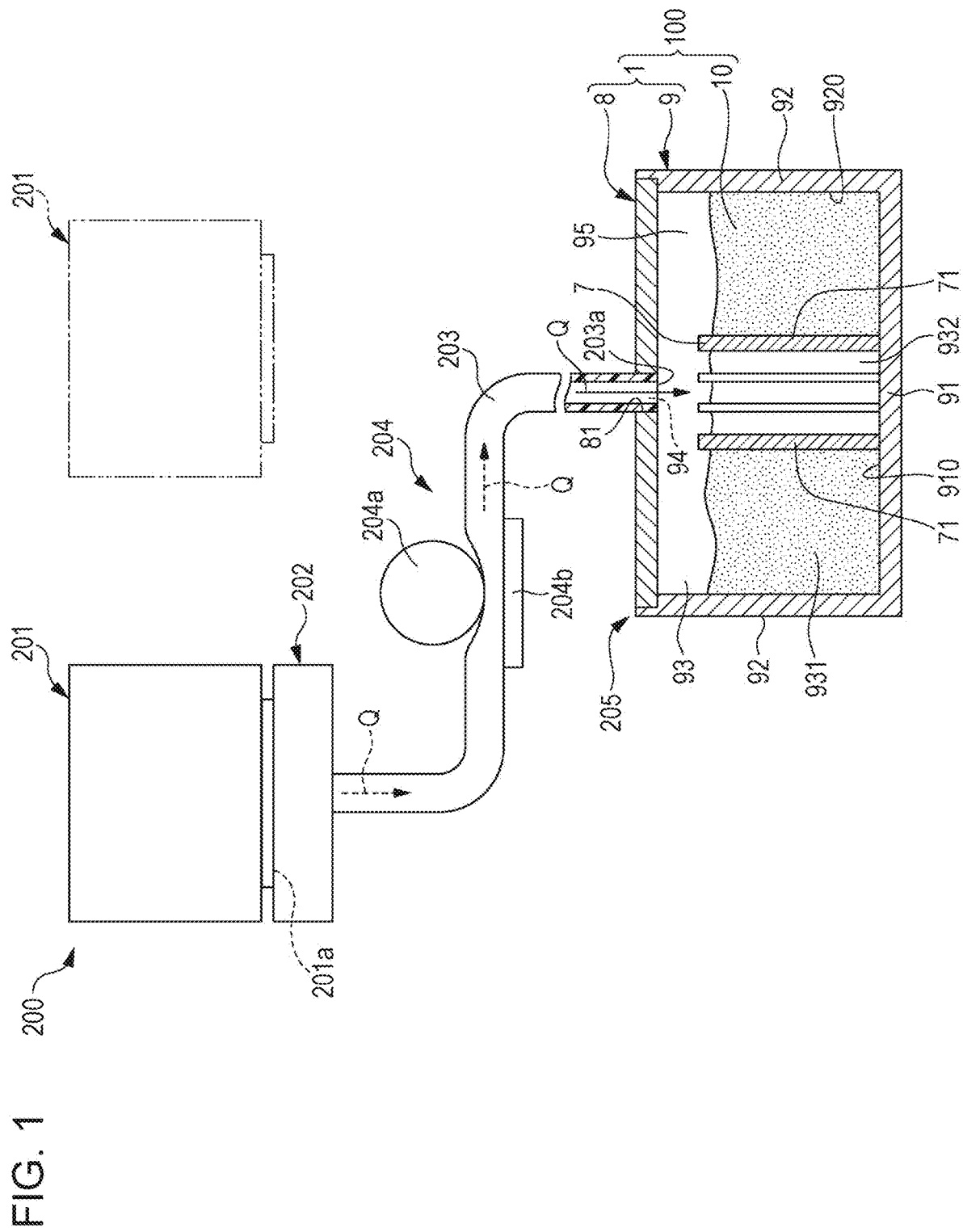
FIG. 1 is a partial vertical sectional view illustrating an example of a use state of a liquid absorber according to a first embodiment of the present disclosure.
Figure 2:
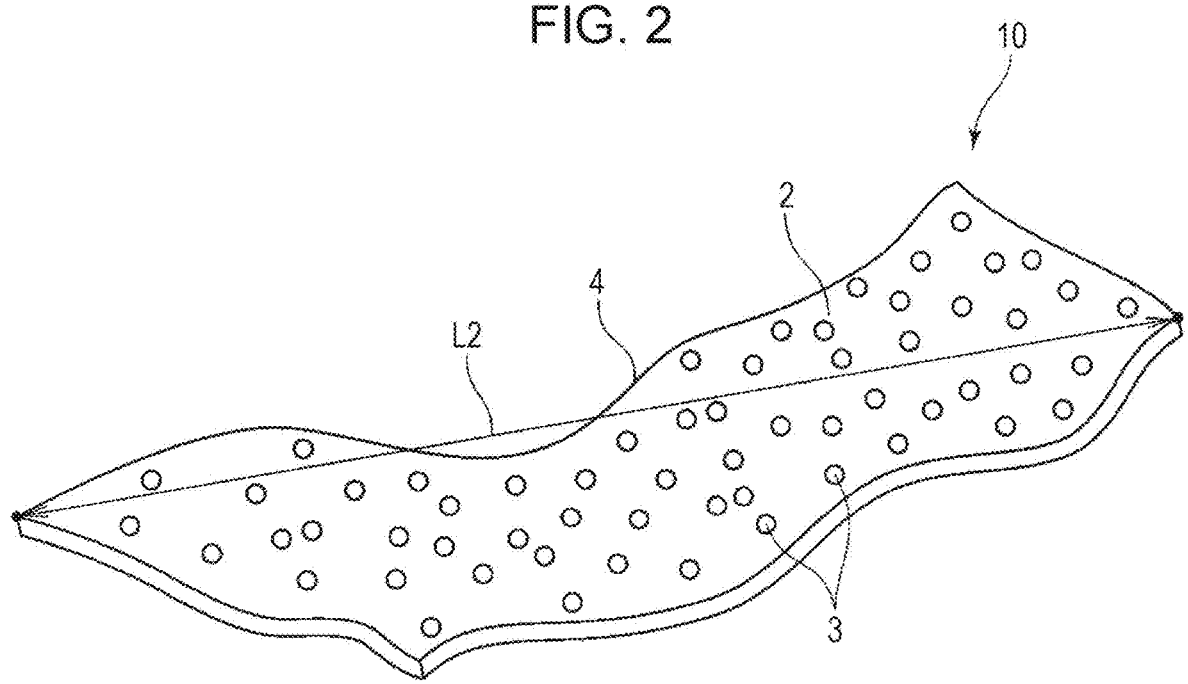
FIG. 2 is a perspective view illustrating an example of a small piece provided in the liquid absorber illustrated in FIG. 1.
Figure 3:
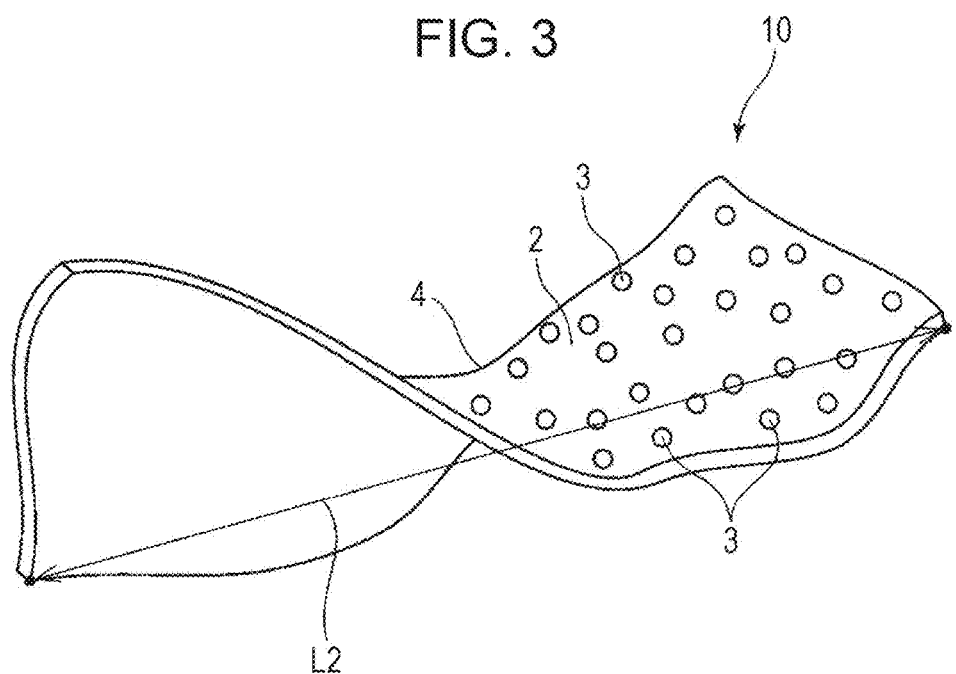
FIG. 3 is a perspective view illustrating an example of the small piece provided in the liquid absorber illustrated in FIG. 1.
Figure 4:
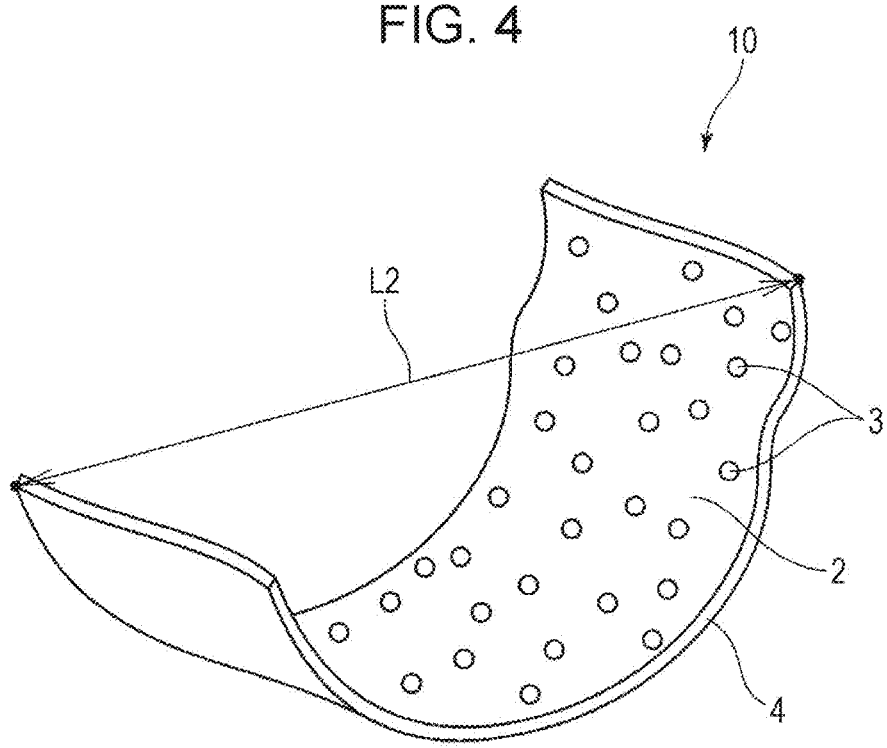
FIG. 4 is a perspective view illustrating an example of the small piece provided in the liquid absorber illustrated in FIG. 1.
Figure 5:
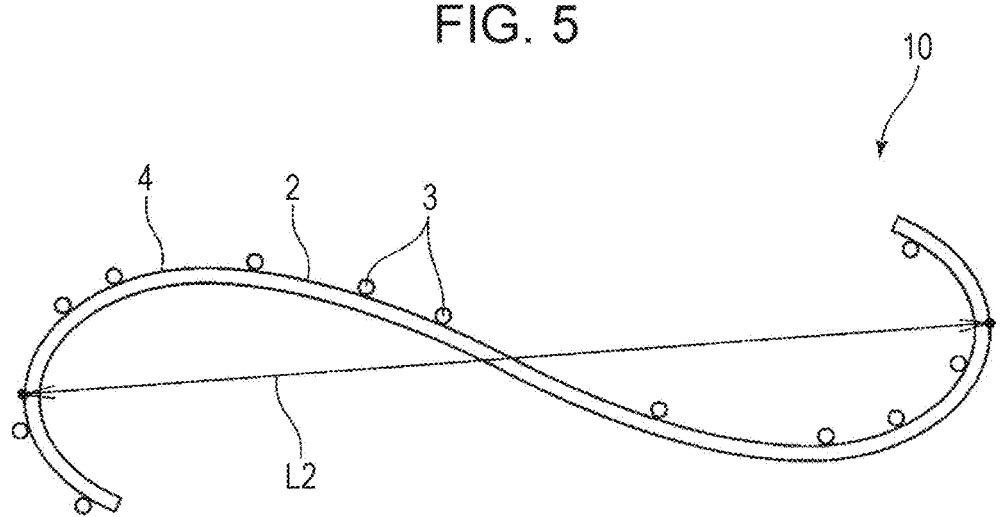
FIG. 5 is a side view of the small piece provided in the liquid absorber illustrated in FIG. 1.
Figure 6:
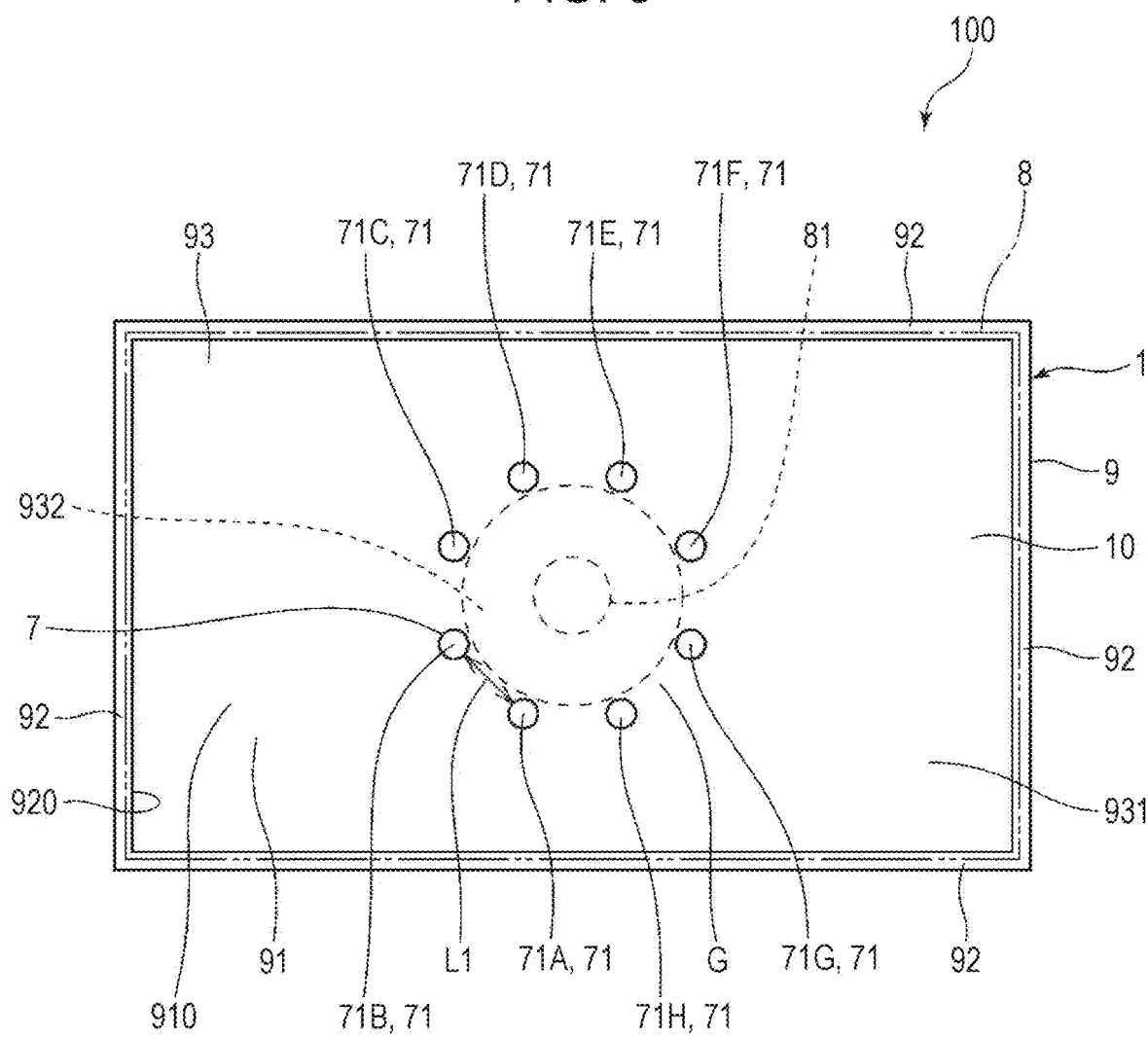
FIG. 6 is a view of the liquid absorber illustrated in FIG. 1 when viewed from a lid side.
Figure 7:
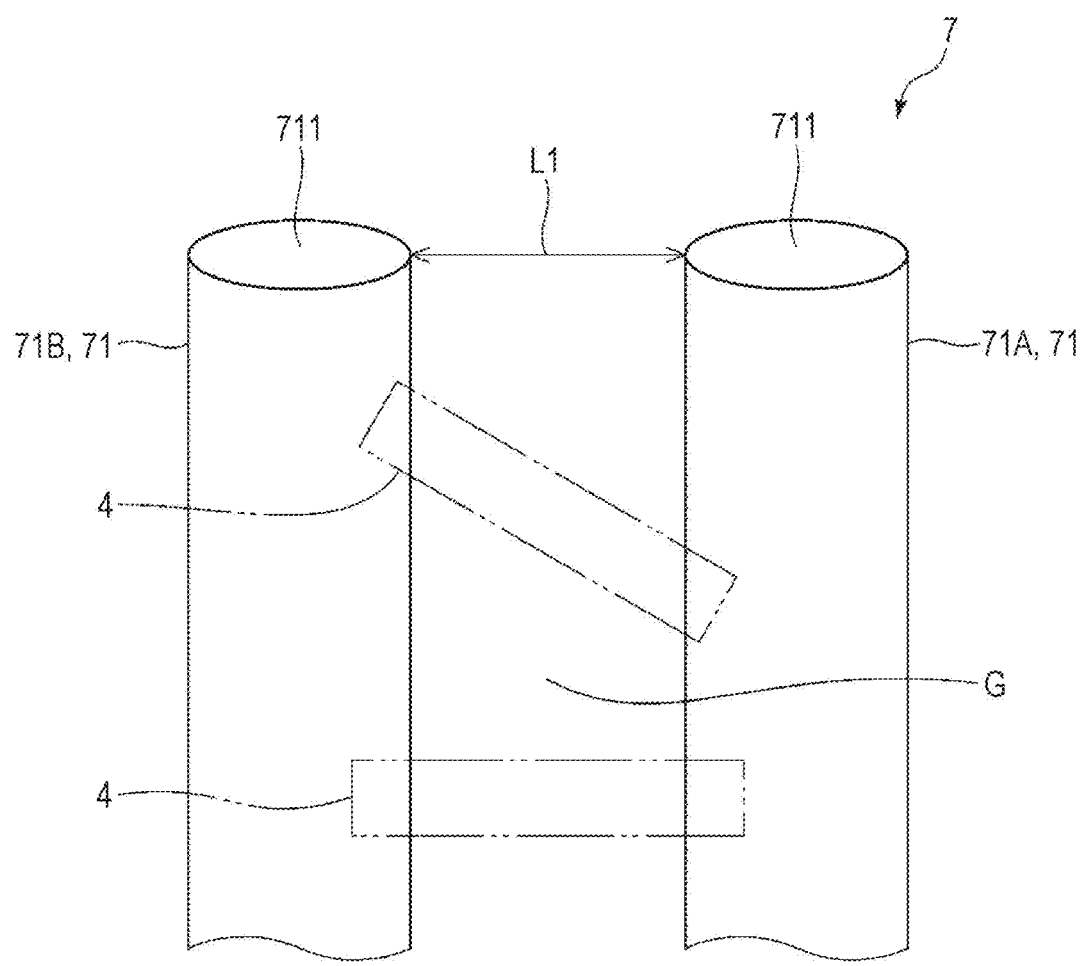
FIG. 7 is an enlarged perspective view of a protrusion portion illustrated in FIG. 1.

FIG. 1 is a partial vertical sectional view illustrating an example of a use state of a liquid absorber according to a first embodiment of the present disclosure. FIG. 2 is a perspective view of a small piece provided in the liquid absorber illustrated in FIG. 1. FIG. 3 is a perspective view of the small piece provided in the liquid absorber illustrated in FIG. 1. FIG. 4 is a perspective view of the small piece provided in the liquid absorber illustrated in FIG. 1. FIG. 5 is a side view of the small piece provided in the liquid absorber illustrated in FIG. 1. FIG. 6 is a view of the liquid absorber illustrated in FIG. 1 when viewed from a lid side. FIG. 7 is an enlarged perspective view of a protrusion portion illustrated in FIG. 1.

Hereinafter, for convenience of description, upper sides in FIGS. 1 and 7 (similarly to FIGS. 9 and 11 to 14) are referred to as "upper" or "upward", and lower sides are referred to as "lower" or "downward".

In the present specification, "ink absorption" refers to absorbing ink such as an aqueous ink in which a coloring material is dissolved in an aqueous solvent, a solvent-based ink in which a binder is dissolved in a solvent, a UV curable ink in which a binder is dissolved in a liquid monomer cured by UV irradiation, and a latex ink in which a binder is dispersed in dispersion medium, and other liquid such as water, excrement, and industrial waste liquid. Hereinafter, a liquid will be described as an ink Q.

As illustrated in FIG. 1, a liquid absorber 100 of the present disclosure is provided with a container 1 and an ink absorbent body 10 that is stored in the container 1 and serves as a liquid absorbent body used for absorbing the ink Q. The liquid absorber 100 can be used, for example, by being loaded into a printing apparatus 200 as illustrated in FIG. 1. First, the printing apparatus 200 will be briefly described.

The printing apparatus 200 illustrated in FIG. 1 is, for example, an ink jet type color printer. The printing apparatus 200 is provided with an ink ejection head 201 ejecting the ink Q, a capping unit 202 preventing clogging of a nozzle 201a of the ink ejection head 201, a tube 203 coupling the capping unit 202 and the liquid absorber 100, a roller pump 204 sending the ink Q from the capping unit 202 to the liquid absorber 100, and a collecting portion 205.

The ink ejection head 201 has a plurality of nozzles 201a ejecting the ink Q downward. As illustrated by a two-dot chain line in FIG. 1, the ink ejection head 201 can perform printing by ejecting the ink Q while moving to a recording medium (not illustrated).

The capping unit 202 collectively sucks each of the nozzles 201a by the operation of the roller pump 204 when the ink ejection head 201 is in a standby position, and prevents clogging of the nozzles 201a.

The tube 203 is a tube passing the ink Q sucked through the capping unit 202 toward the liquid absorber 100. The tube 203 is flexible.

The roller pump 204 is disposed in the middle of the tube 203, and includes a roller portion 204a and a pinching portion 204b which pinches the middle of the tube 203 between the pinching portion 204b and the roller portion 204a. The rotation of the roller portion 204a generates a suction force on the capping unit 202 through the tube 203. The roller portion 204a keeps rotating, so that the ink Q adhering to the nozzle 201a can be fed to the collecting portion 205. The liquid absorber 100 is disposed in the collecting portion 205, and absorbs the ink Q discharged from the tube 203.

In addition, the liquid absorber 100 is detachably attached to the collecting portion 205 of the printing apparatus 200, and in the attached state, is used to absorb the waste liquid of the ink Q as described above. As described above, the liquid absorber 100 is used as a so-called "waste liquid tank" or "waste ink tank". When the absorption amount of the ink Q of the liquid absorber 100 reaches the limit, the liquid absorber 100 can be replaced with a new unused liquid absorber 100. A detection portion (not illustrated) in the printing apparatus 200 detects whether or not the absorption amount of the ink Q of the liquid absorber 100 reaches the limit. In addition, when the absorption amount of the ink Q of the liquid absorber 100 reaches the limit, that effect is notified by, for example, a notification portion, not illustrated, such as a monitor incorporated in the printing apparatus 200.

Hereinafter, a configuration of the liquid absorber 100 will be described.

As illustrated in FIG. 1, the liquid absorber 100 is provided with a container 1 as an ink absorbent body storage container, and an ink absorbent body 10 as a liquid absorbent body used for absorbing the ink Q.

The ink absorbent body 10 is used for absorbing the ink Q in the container 1. As illustrated in FIG. 2, the ink absorbent body 10 includes a small piece aggregate provided with a plurality of longitudinal small pieces 4 having a fiber base material 2 and a water absorbent resin 3. The water absorbent resin 3 may be carried on the fiber base material 2 or may not be carried, that is, may be simply interposed between the fibers of the fiber base material 2, for example.

Since the ink absorbent body 10 is not one previously formed into a predetermined shape such as a block or the like, and is an aggregate of the small pieces 4, when filling the container 1 with the ink absorbent body 10, a relative positional relationship between the small pieces 4 can be changed, and a shape of the entire ink absorbent body 10 changes in accordance with a shape of a storage space of the container. Therefore, it is possible to effectively prevent occurrence of unintentional variations in density in the container 1. In particular, not only for containers of specific shapes and sizes, containers of various shapes can be filled at a desired density while effectively preventing the occurrence of unintentional variations in density. As a result, the absorption efficiency of the ink Q can be made excellent in the ink absorbent body 10 in a state of being stored in the container.

In addition, since a gap is easily formed between the small pieces 4, the ink Q can pass through the gap or, when the gap is minute, the ink Q can spread by wetting due to the capillary action, that is, the liquid permeability can be ensured. As a result, the ink Q flowing downward in the container 1 is prevented from being blocked in the middle, and thus can permeate to the bottom of the container 1. As a result, each of the small pieces 4 can suitably absorb the ink Q and hold the ink Q.

In addition, the length of the small pieces 4 in a state where each of the small pieces 4 is corrected and flattened, that is, the length of the long side is preferably 0.2 mm or more and 5,000 mm or less, more preferably 0.6 mm or more and 2,000 mm or less, and still more preferably 1.0 mm or more and 100 mm or less.

Similarly, the average value of the width of the small pieces 4 in a state where each of the small pieces 4 is corrected and flattened is not particularly limited, and the average value is preferably 0.1 mm or more and 100 mm or less, more preferably 0.3 mm or more and 50 mm or less, and still more preferably 1 mm or more and 20 mm or less.

The average value of aspect ratio, which is a ratio of the total length to the width for each of the small pieces 4, is preferably 2.0 or more and 200 or less, and more preferably 2.5 or more and 30 or less.

The average value of the thickness of the small pieces 4 is preferably 0.05 mm or more and 3 mm or less, and more preferably 0.1 mm or more and 2 mm or less.

According to the above numerical range, it is possible to more suitably carry on the water absorbent resin 3, hold the ink Q by the fibers, and feed the ink Q into the water absorbent resin 3, and it is possible to make the absorption characteristics of the ink Q of the entire small piece 4 more excellent. Furthermore, the entire ink absorbent body 10 is likely to be deformed, and the shape followability to the container 1 is excellent.

The ink absorbent body 10 may include the small pieces 4 having different sizes and shapes.

In addition, the ink absorbent body 10 may include the small pieces 4 in which at least one of the total length, width, aspect ratio, and thickness are the same as each other, or may include the small pieces 4 in which all of them are different from each other.

In addition, although the small piece 4 may have an irregular shape when the small piece 4 is made flat by correcting curve or bending, it is preferable that the small piece 4 has a regular shape. Specifically, it is preferable that the small piece 4 is cut, that is, crushed into a regular shape by a shredder or the like. As a result, unintended unevenness in the bulk density of the ink absorbent body 10 is unlikely to occur, and unintended unevenness in the absorption characteristics of the ink Q can be prevented in the container. In addition, the small piece 4 cut or crush into a regular shape can reduce the area of the cut surface as much as possible. Therefore, it is possible to suppress dust generation due to scattering of fibers and the water absorbent resin 3 while ensuring appropriate absorption characteristics.

In the present specification, the "regular shape" refers to, for example, a shape such as a rectangle, a square, a triangle, a polygon such as a pentagon, a circle, an ellipse or the like. In addition, each of the small pieces 4 may have the same size or a similar shape. In addition, for example, in the case where the shape of the small piece 4 is rectangle, even when the lengths of the sides are different from each other, when it is categorized as rectangle, the small piece 4 has the regular shape.

In addition, in the present specification, the "irregular shape" refers to a shape other than the "regular shape" as described above, such as a shape roughly cut or torn by hands.

The content of the small pieces 4 having regular shapes when the small pieces 4 are made flat by correcting curve and bending as described above is preferably 30% by mass or more, more preferably 50% by mass or more, and still more preferably 70% by mass or more of the entire ink absorbent body 10.

As described above, each of the small pieces 4 has an elongated shape, that is, has a longitudinal direction. The container is filled so that the extension directions of each of the small pieces 4 differ from each other. That is, the plurality of small pieces 4 are stored in the container 1 as an aggregate without regularity so that the extension directions of the small pieces 4 intersect with each other without being aligned. Furthermore, in other words, each of the small pieces 4 is stored at random in a two-dimensional direction or a three-dimensional direction in the container.

In such a stored state, a gap is likely to be formed between the small pieces 4. As a result, the ink Q can pass through the gap, and when the gap is minute, the ink Q can be spread by wetting due to the capillary action. That is, liquid permeability can be ensured. As a result, the ink Q flowing downward in the container 1 is prevented from being blocked in the middle, and thus can permeate to the bottom of the container 1. As a result, each of the small pieces 4 can suitably absorb the ink Q and hold the ink Q for a long period of time.

In addition, since each of the small pieces 4 is stored at random, the entire ink absorbent body 10 has an increased chance of contacting the ink Q, and thus the absorption characteristics absorbing the ink Q is improved. In addition, when the ink absorbent body 10 is stored in the container, each of the small pieces 4 can be randomly put into the container 1, and thus the storing operation can be performed easily and rapidly.

In addition, each of the small pieces 4 may be curved or bent in the middle of the longitudinal direction, or may be twisted. In addition, the shapes of each of the small pieces 4 may be different from each other. That is, the degree of curve or bending, the degree of twist, and the position of each of the small pieces 4 may be different from each other.

In addition, a "distance between the farthest ends" of a small piece 4 described later refers to a length of a longest portion in a contour of a projection shape having a largest area among the projection shapes obtained by projecting the small piece 4 from all directions in the three-dimensional space. For example, as illustrated in FIG. 2, when the small piece 4 has a substantially flat shape, the length of the longer diagonal line is the distance between the farthest ends. In addition, for example, when the small piece 4 is twisted as illustrated in FIG. 3, or when the small piece 4 is curved in one direction as illustrated in FIG. 4, the length of the longer straight line is the distance between the farthest ends among the straight lines coupling the corners located on the diagonal line. In addition, for example, as illustrated in FIG. 5, when forming a curved shape having a plurality of inflection points, that is, when forming an S-shape in side view, the longest portion as illustrated by the arrow in FIG. 5 is the distance between the farthest ends.

In addition, in the present specification, the average value of the distances between the farthest ends of each of the small pieces 4 is defined as an average value L2 of the distances between the farthest ends. In addition, in order to calculate the average value L2 of the distances between the farthest ends, it is not necessary to measure the average value of all the small pieces 4 filled in the container 1. The average value of the distances between the farthest ends of approximately 16 small pieces 4 randomly extracted is calculated, and this value can be regarded as the average value L2 of the distances between the farthest ends.

Even when the small piece 4 has not the elongated shape, the length of the longest portion is the distance between the farthest ends in the contour of the projection shape having the largest area among the projection shapes obtained by projecting the small piece 4 from all directions in a three-dimensional space.

In addition, the distance between the farthest ends in the small piece 4 can be measured, for example, using a digital microscope such as VHX-5000 manufactured by Keyence Corporation.

The small piece 4 includes the fiber base material 2 having the above-described shape, and the water absorbent resin 3 carried on at least one surface side of the fiber base material 2. Since the water absorbent resin 3 is carried on at least one surface side of the fiber base material 2, the ink Q reached a surface of the fiber base material 2 on which the water absorbent resin 3 is carried can be absorbed, and the ink Q reached an opposite surface on a rear side can be rapidly propagated and permeated.

In the illustrated configuration, although the water absorbent resin 3 is carried only on one surface side of the fiber base material 2, the water absorbent resin 3 may be carried on both sides of the fiber base material 2, that is, on a surface on a front side and on a surface on a rear side. In this case, it is preferable that the adhesion amount of the water absorbent resin 3 differs between the surface on the front side and the surface on the rear side. As a result, the absorption and propagation of the ink Q can be adjusted more suitably.

Hereinafter, the fiber base material 2 will be described.

The fiber base material 2 is a supporter that carries on the water absorbent resin 3 on the surface thereof. The water absorbent resin 3 can be suitably carried on the fiber base material 2, and the detachment of the water absorbent resin 3 from the fiber base material 2 can be more suitably prevented. In addition, when the ink Q is applied to the small piece 4, the fiber base material 2 temporarily holds the ink Q, and thereafter the water absorbent resin 3 can be efficiently fed, and the absorption characteristics of the ink Q of the entire small piece 4 can be improved. In addition, in general, fibers such as cellulose fibers are inexpensive than the water absorbent resin 3 and are also advantageous from the viewpoint of reducing the production cost of the small piece 4. In particular, when fibers derived from a waste paper are used, the above effects are more significantly exhibited. In addition, it is also advantageous from the viewpoint of waste reduction and effective use of resources.

Examples of the fibers constituting the fiber base material 2 include synthetic resin fibers such as polyester fibers and polyamide fibers; natural resin fibers such as cellulose fibers, keratin fibers, and fibroin fibers, and chemically modified products thereof, and these may be used alone or in an appropriate mixture. It is preferable to use mainly cellulose fibers, and it is more preferable that substantially all of them are cellulose fibers.

Since cellulose is a material having a suitable hydrophilic property, when the ink Q is applied to the small piece 4, the ink Q can be suitably taken in, a state of a particularly high fluidity, for example, of a viscosity of 10 mPa·s or less can be rapidly released, and the ink Q once taken in can be suitably fed into the water absorbent resin 3. As a result, it is possible to make the absorption characteristics of the ink Q of the entire small piece 4 particularly excellent. In addition, since cellulose has normally a high affinity to the water absorbent resin 3, the water absorbent resin 3 can be more suitably carried on the surface of the fiber. In addition, the cellulose fiber is a renewable natural material, and among various types of fibers, it is inexpensive and easily available, so that it is also advantageous from the viewpoints of reduction of production cost of small piece 4, stable production, reduction of environmental load, and the like.

In the present specification, the cellulose fiber may be any fiber having cellulose as a compound as the main component and having a fibrous shape, and may contain hemicellulose and lignin in addition to cellulose.

The average length of the fibers is not particularly limited, and is preferably 0.1 mm or more and 7 mm or less, more preferably 0.1 mm or more and 5 mm or less, and still more preferably 0.1 mm or more and 3 mm or less. The average width of the fibers is not particularly limited, and is preferably 0.05 mm or more and 2 mm or less, and more preferably 0.1 mm or more and 1 mm or less.

The average aspect ratio, that is ratio of average length to average width of the fibers is not particularly limited, and is preferably 10 or more and 1,000 or less, and more preferably 15 or more and 500 or less.

According to the above numerical range, it is possible to more suitably carry on the water absorbent resin 3, hold the ink Q by the fibers, and feed the ink Q into the water absorbent resin 3, and it is possible to make the absorption characteristics of the ink Q of the entire small piece 4 more excellent.

Next, the water absorbent resin 3 will be described.

The water absorbent resin 3 which is a component of the ink absorbent body 10 may be any resin having a water absorbency and is not particularly limited. Examples thereof include carboxymethyl cellulose, polyacrylic acid, polyacrylamide, starch-acrylic acid graft copolymer, hydrolyzate of starch-acrylonitrile graft copolymer, vinyl acetate-acrylic ester copolymer, copolymer of isobutylene and maleic acid, hydrolyzate of acrylonitrile copolymer or acrylamide copolymer, polyethylene oxide, polysulfonic acid compound, polyglutamic acid, salts thereof, crosslinked products thereof, and the like. Here, the water absorbency refers to the function of having hydrophilicity and holding water. Many of the water absorbent resins 3 gel when absorbed by water.

Among these, the water absorbent resin 3 is preferably a resin having a functional group in the side chain. Examples of the functional group include an acid group, a hydroxyl group, an epoxy group, an amino group, and the like.

In particular, the water absorbent resin 3 is preferably a resin having an acid group in the side chain, and more preferably a resin having a carboxyl group in the side chain.

Examples of the carboxyl group-containing unit constituting the water absorbent resin 3 include acrylic acid, methacrylic acid, itaconic acid, maleic acid, crotonic acid, fumaric acid, sorbic acid, cinnamic acid, and those derived from monomers such as anhydrides and salts thereof.

When the ink absorbent body 10 includes the water absorbent resin 3 having an acid group in the side chain, the proportion of acid groups contained in the water absorbent resin 3 which are neutralized to form a salt is preferably 30 mol % or more and 100 mol % or less, more preferably 50 mol % or more and 95 mol % or less, still more preferably 60 mol % or more and 90 mol % or less, and most preferably 70 mol % or more and 80 mol % or less.

As a result, the ink Q absorbing property by the ink absorbent body 10 can be made more excellent.

The type of the salt for neutralization is not particularly limited, examples thereof include alkali metal salts such as sodium salts, potassium salts and lithium salts, salts of nitrogen-containing basic substances such as ammonia, and the like, and sodium salts are preferable.

As a result, the ink Q absorbing property by the ink absorbent body 10 can be made more excellent.

The water absorbent resin 3 having an acid group in the side chain is preferable because electrostatic repulsion between the acid groups occurs at the time of ink Q absorption, and an absorption rate is fast. In addition, when the acid group is neutralized, the ink Q is likely to be absorbed inside the water absorbent resin due to osmotic pressure.

The water absorbent resin 3 may have a structural unit not containing an acid group, and examples of the structural unit include a hydrophilic structural unit, a hydrophobic structural unit, and structural unit containing a polymerizable crosslinking agent, and the like.

Examples of the hydrophilic structural unit include structural units derived from nonionic compounds such as acrylamide, methacrylamide, N-ethyl (meth) acrylamide, N-n-propyl (meth) acrylamide, N-isopropyl (meth) acrylamide, N, N-dimethyl (meth) acrylamide, 2-hydroxyethyl (meth) acrylate, 2-hydroxypropyl (meth) acrylate, methoxypolyethylene glycol (meth) acrylate, polyethylene glycol mono (meth) acrylate, N-vinyl pyrrolidone, N-acryloyl piperidine, and N-acryloyl pyrrolidine.

Examples of the hydrophobic structural unit include structural units derived from compounds such as (meth) acrylonitrile, styrene, vinyl chloride, butadiene, isobutene, ethylene, propylene, stearyl (meth) acrylate, and lauryl (meth) acrylate.

Examples of the structural unit to be the polymerizable crosslinking agent include structural units derived from diethylene glycol diacrylate, N, N'-methylene bisacrylamide, polyethylene glycol diacrylate, polypropylene glycol diacrylate, trimethylolpropane diallyl ether, trimethylolpropane triacrylate, allyl glycidyl ether, pentaerythritol triallyl ether, pentaerythritol diacrylate monostearate, bisphenol diacrylate, isocyanuric acid diacrylate, tetraallyloxyethane, and diallyloxyacetate.

As the water absorbent resin 3, a polyacrylate copolymer or a polyacrylic acid polymer crosslinked product is preferable from the viewpoint of absorption characteristics, cost and the like.

As a polyacrylic acid polymerization crosslinked product, the proportion of a structural unit having a carboxyl group in the total structural units constituting a molecular chain is preferably 50 mol % or more, more preferably 80 mol % or more, and still more preferably 90 mol % or more.

When the proportion of the structural unit containing a carboxyl group is too low, it may be difficult to make the absorption characteristics of the ink Q sufficiently excellent.

The carboxyl group in the polyacrylic acid polymerization crosslinked product is preferably partially neutralized to form a salt.

The proportion of neutralized ones in the total carboxyl groups in the polyacrylic acid polymer crosslinked product is preferably 30 mol % or more and 99 mol % or less, more preferably 50 mol % or more and 99 mol % or less, and still more preferably 70 mol % or more and 99 mol % or less.

In addition, the water absorbent resin 3 may have a structure crosslinked by a crosslinking agent other than the above-described polymerizable crosslinking agent.

When the water absorbent resin 3 is a resin having an acid group, for example, a compound having a plurality of functional groups reactive with the acid group can be preferably used as the crosslinking agent.

When the water absorbent resin 3 is a resin having a functional group reactive with the acid group, a compound having a plurality of functional groups reactive with the acid group in the molecule can be suitably used as the crosslinking agent.

Examples of the crosslinking agent which is a compound having the plurality of functional groups reactive with the acid group include glycidyl ether compounds such as ethylene glycol diglycidyl ether, trimethylolpropane triglycidyl ether, (poly) glycerin polyglycidyl ether, diglycerin polyglycidyl ether, and propylene glycol diglycidyl ether; polyhydric alcohols such as (poly) glycerin, (poly) ethylene glycol, propylene glycol, 1,3-propanediol, polyoxyethylene glycol, triethylene glycol, tetraethylene glycol, diethanolamine, and triethanolamine; polyvalent amines such as ethylenediamine, diethylenediamine, polyethyleneimine, and hexamethylenediamine. In addition, polyvalent ions such as zinc, calcium, magnesium, and aluminum can be suitably used because these react with the acid groups of the water absorbent resin 3 to function as a crosslinking agent.

The water absorbent resin 3 may have any shape, for example, scaly, acicular, fibrous, or particulate shape, and the majority thereof is preferably in the form of particles. When the water absorbent resin 3 is in the form of particles, the permeability of the ink Q can be easily ensured. In addition, the water absorbent resin 3 can be suitably carried on the fiber base material 2. The particulate shape refers to the ratio of the maximum length to the minimum length is 0.7 or more and 1.0 or less.

The average particle diameter of the particles is preferably 10 μm or more and 800 μm or less, more preferably 20 μm or more and 600 μm or less, and still more preferably 30 μm or more and 500 μm or less.

As a result, the effects as described above can be more reliably exhibited.

On the other hand, when the average particle diameter of the particles is too small, the permeability of the ink Q to the inside of the ink absorbent body 10 is likely to be reduced.

In addition, when the average particle diameter of the particles is too large, a specific surface area of the water absorbent resin 3 is small, the absorption characteristics of the ink Q decrease, and the absorption rate of the ink Q decreases.

In the present disclosure, the average particle diameter refers to a volume-based average particle diameter. The average particle diameter can be determined, for example, by measurement with a particle diameter distribution measuring device having a laser diffraction and scattering method as a measurement principle, that is, a laser diffraction type particle diameter distribution measuring device.

The particles may contain components other than the water absorbent resin. Examples of such components include surfactants, lubricants, antifoaming agents, fillers, anti-blocking agents, ultraviolet absorbing agents, and the like.

The water absorbent resin 3 may have a uniform structure as a whole, or may have a different structure at each portion. For example, in the water absorbent resin 3, the area near the surface, more specifically, the area with a thickness of approximately 1 μm from the surface may have a higher degree of cross-linking than that of other portion.

As a result, it is possible to improve an absorption ratio and an absorption rate of the ink Q, strength of the water absorbent resin 3, and the like in a more balanced manner.

In addition, the adhesion between the water absorbent resin 3 and the fibers can be made more excellent, and the ink Q once held by the fibers can be fed efficiently by the water absorbent resin, and the absorption characteristics of the entire ink absorbent body 10 can be further improved.

In addition, as illustrated in FIG. 3, the water absorbent resin 3 is carried on one surface side of the fiber base material 2. In addition, a portion of the water absorbent resin 3 is penetrated inward from one surface of the fiber base material 2. That is, a portion of the water absorbent resin 3 is impregnated in the fiber base material 2. As a result, the carrying capacity of the water absorbent resin 3 to the fiber base material 2 can be enhanced. Therefore, the water absorbent resin 3 can be prevented from detaching in the container 1. As a result, the high absorption characteristics of the ink Q can be exhibited over a long period of time, the water absorbent resin 3 can be prevented from being unevenly distributed in the container 1, and the occurrence of unevenness in the absorption characteristics of the ink Q can be prevented.

In the present specification, "impregnation" refers to a state of being embedded in which at least a portion of the particles of the water absorbent resin 3 penetrates inward from the surface of the fiber base material 2. In addition, it is not necessary for all particles to be impregnated. In addition, a state where the particles of the water absorbent resin 3 penetrate in the inside of the fiber base material 2 by softening and come out to the rear surface of the fiber base material 2 is also included.

The content of the water absorbent resin 3 in the small pieces 4 is preferably 25% by mass or more and 300% by mass or less, and more preferably 50% by mass or more and 150% by mass or less with respect to the fiber. As a result, the water absorbency and permeability can be sufficiently ensured.

When the content of the water absorbent resin 3 in the small pieces 4 is too low, the water absorbency may be insufficient. On the other hand, when the content of the water absorbent resin 3 in the small piece 4 is too high, there is a possibility that the expansion coefficient of the small piece 4 tends to increase, and the permeability may be reduced.

In addition, the small pieces 4 may contain components other than those described above.

Examples of such components include surfactants, lubricants, antifoaming agents, fillers, anti-blocking agents, ultraviolet absorbing agents, colorants such as pigments and dyes, flame retardants, flow improvers, and the like.

The content of the other components in the small piece 4 is preferably 10% by mass or less, and more preferably 5.0% by mass or less.

Next, the container 1 will be described.

As illustrated in FIG. 1, the container 1 is provided with a container main body 9 having a storage space 93 for storing the ink absorbent body 10, and a lid 8 detachably attached to the container main body 9.

The container main body 9 has a box shape having a bottom portion 91 having, for example, a rectangular shape in a plan view and four side wall portions 92 erected upward from edge portions of the bottom portion 91. The upper end sides of the four side wall portions 92, that is, the sides opposite to the bottom portion 91, is closed by the lid 8, and the ink absorbent body 10 can be stored in the storage space 93 surrounded by the bottom portion 91, the four side wall portions 92, and the lid 8. In other words, the bottom portion 91, the four side wall portions 92, and the lid 8 are wall portions that define the storage space 93.

Hereinafter, the surface of the bottom portion 91 facing the storage space 93 is referred to as a bottom surface 910, and the surface of the side wall portion 92 facing the storage space 93 is referred to as an inside surface 920.

The container main body 9 is not limited to the one having the bottom portion 91 having a square shape in plan view, may have, for example, the bottom portion 91 having a circular shape in plan view, and the whole may be cylindrical.

In addition, when the volume of the container main body 9, that is, the volume of the storage space 93 is V1, and the total volume of the ink absorbent body 10 before absorbing the ink Q, that is, before the water absorption is V2, the ratio V2/V1 between V1 and V2 preferably 0.1 or more and 1.0 or less, and more preferably 0.4 or more and 0.9 or less. As a result, a void 95 is formed in the container main body 9 above the ink absorbent body 10. The ink absorbent body 10 once expands (swells) after absorbing the ink Q. The void 95 serves as a buffer when the ink absorbent body 10 expands, and therefore, the ink absorbent body 10 can sufficiently absorb the ink Q.

In the present embodiment, the container main body 9 is rigid, that is, has a shape retention property such that the volume V1 does not change by, for example, 10% or more when an internal pressure or an external force acts on the container main body 9. As a result, the container main body 9 can maintain the shape of the container main body 9 itself even when the ink absorbent body 10 absorbs the ink Q, and thereafter expands to receive the force from the ink absorbent body 10 from the inside. Therefore, the installation state of the container main body 9 in the printing apparatus 200 is stabilized, and the ink absorbent body 10 can stably absorb the ink Q.

As long as the container main body 9 is made of a material that does not transmit the ink Q, the constituent material is not particularly limited. As a constituent material of such a container main body 9, for example, various resin materials such as cyclic polyolefin and polycarbonate can be used. In addition, as the constituent material of the container main body 9, various metal materials such as aluminum and stainless steel can be used in addition to the various resin materials, for example.

The container main body 9 is not limited to a rigid material, and may be a flexible material, that is, a material whose volume V1 changes by 10% or more when an internal pressure or an external force acts on the container main body 9.

In addition, the container main body 9 may be transparent or translucent having internal visibility, or may be opaque, and it is preferable that at least a portion of the container main body 9 and the lid 8 described later have internal visibility.

As described above, the liquid absorber 100 is provided with the lid 8. As illustrated in FIG. 1, the lid 8 has a plate shape and can be fitted to an upper opening portion 94 of the container main body 9. By this fitting, the upper opening portion 94 can be sealed in a liquid tight manner. As a result, for example, when the ink Q is discharged from the tube 203 and dropped, even in a case in which the ink Q collides with the ink absorbent body 10 and jumps up, the ink Q can be prevented from scattering outward. Therefore, the ink Q can be prevented from adhering to the periphery of the liquid absorber 100 and being soiled.

A tube 203 is coupled to the central portion of the lid 8, and a supply port 81 is formed as a supply portion that supplies the ink Q into the storage space 93. The supply port 81 is configured to include a through-hole which penetrates the lid 8 in the thickness direction. The downstream end portion of the tube 203 can be inserted into and coupled to the supply port 81. In addition, at this time, a discharge port 203a of the tube 203 faces downward. The supply port 81 may be formed at a position shifted from the central portion of the lid 8.

In addition, the lid 8 may have an absorbing property to absorb the ink Q, or may have a lyophobic property to repel the ink Q.

The thickness of the lid 8 is not particularly limited, and is preferably, for example, 1 mm or more and 20 mm or less, and more preferably 8 mm or more and 10 mm or less. The lid 8 is not limited to a plate shape having such a numerical range, and may be a film shaped (sheet shaped) one thinner than the plate shape. In this case, the thickness of the lid 8 is not particularly limited, and is preferably, for example, 10 μm or more and less than 1 mm.

In addition, the lid 8 preferably has water vapor permeability. As a result, the moisture evaporated from the absorbed ink Q can be transmitted to the outside. Therefore, the amount by which the ink absorbent body 10 can absorb the ink Q can be increased.

In addition, the water vapor permeability of the lid 8 is preferably 1.0 g/m²·day (40° C./90% RH) or more and 5,000 g/m²·day (40° C./90% RH) or less, and more preferably 2.0 g/m²·day (40° C./90% RH) or more and 2,000 g/m²·day (40° C./90% RH) or less. As a result, the above effect can be more reliably exerted.

The constituent materials of the container main body 9 and the lid 8 as described above are not particularly limited, and for example, various resin materials can be suitably used. Examples of the resin material include various thermoplastic resins, and various curable resins such as a thermosetting resin and a photocurable resin. Specifically, examples thereof include polyolefins such as polyethylene, polypropylene, and ethylene-propylene copolymers, polyesters such as polyvinyl chloride, polystyrene, polyamide, polyimide, polycarbonate, poly-(4-methylpentene-1), ionomer, acrylic resin, polymethyl methacrylate, acrylonitrile-butadiene-styrene copolymer (ABS resin), acrylonitrile-styrene copolymer (AS resin), butadiene-styrene copolymer, polyethylene terephthalate (PET), and polybutylene terephthalate (PBT), polyether, polyetherketone (PEK), polyetheretherketone (PEEK), polyetherimide, polyacetal (POM), polyphenylene oxide, polysulfone, polyether sulfone, polyphenylene sulfide, polyarylate, aromatic polyester (liquid crystal polymer), polytetrafluoroethylene, polyvinylidene fluoride, other fluororesin, epoxy resin, phenolic resin, urea resin, melamine resin, silicone resin, polyurethane, or copolymers, blends, and polymer alloys mainly containing these, and one or two or more of these can be used in combination.

Such a container 1 has a partition portion 7 that divides the storage space 93 into a first storage space 931 and a second storage space 932. The partition portion 7 has a plurality of protrusion portions 71, and eight protrusion portions 71 in the configuration illustrated in the figure. Hereinafter, the eight protrusion portions 71 are referred to as a protrusion portion 71A, a protrusion portion 71B, a protrusion portion 71C, a protrusion portion 71D, a protrusion portion 71E, a protrusion portion 71F, a protrusion portion 71G, and a protrusion portion 71H. The protrusion portions 71A to 71H are provided to protrude upward from a bottom surface 910 of the bottom portion 91, that is, protrude toward the storage space 93. In addition, the protrusion-portions 71A to 71H are spaced apart from each other at regular intervals so as to form circles when viewed from the lid 8 side.

Each of the protrusion portions 71A to 71H has a round bar shape. The outer diameter of the protrusion portions 71A to 71H, that is, the maximum width is preferably 0.1 mm or more and 10 mm or less, and more preferably 0.5 mm or more and 5 mm or less. The protrusion portions 71A to 71H are not limited to the round bar shape as illustrated in the figure, and may be, for example, prismatic. In addition, the material is not limited to a material such as a resin, may be a porous absorbent body or the like containing pulp, or may be configured to have a shape such that the surface is made uneven so as to be more easily caught.

As described above, the protrusion portion 71 is provided so as to protrude from the bottom surface 910 facing the storage space 93 of the container main body 9, that is, the inner surface of the bottom portion 91. The vicinity of the bottom portion 91 of the container main body 9 is a portion where the small pieces 4 are likely to be concentrated due to the influence of gravity. With the above configuration, the protrusion portion 71 is present in the vicinity of the bottom portion 91 regardless of the length of the protrusion, and the effects of the present disclosure can be more reliably obtained.

In addition, the height of the protrusion portion 71 from the bottom surface of a tip end 711 is preferably 50% or more and 100% or less and more preferably 60% or more and 90% or less of the depth of the container main body. As a result, the length of the protrusion portion 71 can be sufficiently ensured, and the effect of the present disclosure can be exerted even at a position far from the bottom portion 91, that is, at a relatively high position in the storage space 93. In addition, the surface area of the protrusion portion 71 can be sufficiently increased, and the contact area with the small piece 4 can be sufficiently ensured. As a result, unintended movement of the small piece 4 can be more effectively prevented or suppressed. Furthermore, the filling amount of the ink absorbent body 10 can be relatively increased.

A second storage space 932 partitioned by the partition portion 7 overlaps the supply port 81 when viewed from the lid 8 side. Therefore, the ink Q supplied from the supply port 81 is first supplied into the second storage space 932. The ink Q in the second storage space 932 flows out to the first storage space 931 through a gap G formed between the adjacent protrusion portions of the protrusion portions 71A to 71H, and permeates the entire storage space 93. That is, the gap G functions as a communication portion through which the ink Q passes.

As described above, the partition portion 7 has the gap G as the communication portion through which the ink Q as the liquid passes between the first storage space 931 and the second storage space 932. As a result, the ink Q can permeate the entire storage space 93 through the gap G.

Here, in the present embodiment, the first storage space 931 is filled with the ink absorbent body 10, and the second storage space 932 is not filled with the ink absorbent body 10. The ink absorbent body 10 may also be accommodated in the second storage space 932.

As described above, in the first storage space 931 and the second storage space 932 partitioned by the partition portion 7, the filling density, that is, the bulk density of the ink absorbent body 10 is different from each other. The bulk density of the ink absorbent body 10 in the second storage space 932 is lower than the bulk density of the ink absorbent body 10 in the first storage space 931.

In addition, the bulk density of the ink absorbent body 10 in the first storage space 931 is preferably 0.01 g/cm$^3$ or more and 0.50 g/cm$^3$ or less, more preferably 0.05 g/cm$^3$ or more and 0.30 g/cm$^3$ or less, and particularly preferably 0.08 g/cm$^3$ or more and 0.25 g/cm$^3$ or less. As a result, both liquid permeability and absorption capacity can be achieved at a high level.

In addition, the bulk density of the ink absorbent body 10 in the second storage space 932 is preferably 0 g/cm$^3$ or more and 0.40 g/cm$^3$ or less, more preferably 0.04 g/cm$^3$ or more and 0.25 g/cm$^3$ or less, and among these, particularly preferably 0.05 g/cm$^3$ or more and 0.20 g/cm$^3$ or less. As a result, both liquid permeability and absorption capacity can be achieved at a high level.

In addition, the container 1 includes the partition portion 7 that partitions the storage space 93 into the first storage space 931, and the second storage space in which the filling density of the small pieces 4 is lower than that of the first storage space 931, and the protrusion portion 71 belongs to the partition portion 7. As described above, the second storage space 932 to which the ink Q is supplied first is not filled with the ink absorbent body 10, or has a lower bulk density of the ink absorbent body 10 than that of the first storage space 931. As a result, it is possible to prevent or suppress clogging in the second storage space 932 due to swelling of the ink absorbent body 10 caused by the ink absorbent body 10 absorbing the ink Q. That is, the ink Q supplied to the second storage space 932 quickly flows out to the first storage space 931 through the each of the gaps G, and is permeated and absorbed by the ink absorbent body 10 in the first storage space 931.

The container 1 includes a supply port 81 as a supply portion that supplies the ink Q as a liquid to the second storage space 932. As a result, the ink Q can be supplied to the second storage space 932 first, and the above-described effects can be obtained.

Incidentally, in such a liquid absorber 100, since the ink absorbent body 10 is a small piece aggregate having a plurality of small pieces 4, the ink absorbent body 10 is excellent in the absorption characteristics of the ink Q, and when an external force is applied to the container 1 or the direction of the container 1 changes, the container 1 is easily deformed. That is, the small pieces 4 have excellent absorption characteristics, and are likely to move in the container 1. Depending on the degree of this movement, there is a possibility that when viewed as the entire ink absorbent body 10, uneven absorption characteristics may occur or a desired bulk density distribution may not be obtained. On the other hand, in the present disclosure, it is found that the following configuration can prevent or suppress the movement of the small pieces 4. Hereinafter, this will be described.

As described above, in the protrusion portions 71A to 71H, the intervals between the adjacent protrusion portions are the same as each other, and therefore, the following description will be focused on the protrusion portion 71A.

In the present disclosure, when the minimum separation distance between the tip end 711 of the protrusion portion 71A and a structure different from the protrusion portion 71A is L1, $0 < L1/L2 \leq 1.80$ is satisfied.

Here, the "structure different from the protrusion portion 71A" includes the protrusion portions 71B to 71H and the wall portion of the container 1, that is, the bottom portion 91, the four side wall portions 92, and the lid 8. The "minimum separation distance with the structure different from the protrusion portion 71A" refers to a separation distance with the adjacent protrusion portion 71B or the adjacent protrusion portion 71H in the illustrated configuration.

In the present embodiment, the closest structure is the adjacent protrusion portion, regardless of which protrusion portion of the protrusion portions 71A to 71H is focused, and when the wall portion of the container 1, that is, the bottom portion 91, the four side wall portions 92, and the lid 8 are the closest structure bodies, the distance to that portion is the minimum separation distance.

In addition, when the tip end 711 has a surface as the protrusion portions 71A to 71H, the tip end surface is referred to as a "tip end". For example, as illustrated in FIG. 7, the minimum separation distance L1 between the tip end 711 of the protrusion portion 71A and the tip end 711 of the protrusion portion 71B is a length of a straight line binding a point closest to the protrusion portion 71B among the edge portions of the tip end 711 and a point closest to the protrusion portion 71A among the edge portions of the tip end 711 of the protrusion portion 71B.

As described above, the container 1 is provided with the plurality of protrusion portions 71A to 71H, and the minimum separation distance L1 is the distance between the tip ends 711 of the adjacent protrusion portions. As a result, the effects of the present disclosure as described below can be more reliably exerted.

When the minimum separation distance L1 and the average value L2 of the distances between the farthest ends of the small pieces 4 as described above satisfy $0 < L1/L2 \leq 1.80$, although the ink Q is allowed to pass through the gap G formed between the adjacent protrusion portions among the protrusion portions 71A to 71H, it is possible to effectively prevent or suppress the small piece 4 from passing, that is, moving. As a result, the ink absorbent body 10 as a whole can exhibit excellent absorption characteristics without unevenness while sufficiently ensuring the permeability of the ink Q.

When L1/L2 is 1.80, as illustrated in FIG. 7, even when the small piece 4 is inclined with respect to the protrusion portion 71, the small piece 4 cannot pass through the gap G, so that the above-described effect can be exhibited. In this case, the ink Q can naturally pass through the gap G.

When L1/L2>1.80, there is a high probability that the small pieces 4 in the inclined state as illustrated in FIG. 7 pass, and the effect of preventing the small pieces 4 from moving cannot be remarkably exhibited.

On the other hand, since 0<L1/L2, the ink Q can pass through the gap G. When L1/L2 is 0, the gap G is not substantially formed, so that the ink Q cannot flow out to the first storage space 931.

As described above, it is possible to prevent or suppress the movement of the small piece 4 through the gap G while permitting the passage of the ink Q. As a result, it is possible to effectively prevent or suppress the small pieces 4 in the first storage space 931 from unintentionally entering the second storage space 932, and the relationship of the bulk density of the ink absorbent body 10 in the first storage space 931 and the second storage space 932 as described above can be effectively maintained. Furthermore, the ink Q can well penetrate into the first storage space 931 and the ink absorbent body 10 in the first storage space 931 can satisfactorily absorb the ink Q. In addition, the contact area between the small piece 4 and the container 1 can be increased by the provision of the protrusion portion 71, and the entire shape of the ink absorbent body 10 can be easily maintained in a desired shape even when an external force is applied to the container 1.

When $0 < L1/L2 \leq 1.80$ is satisfied, the effects of the present disclosure can be sufficiently exhibited, it is more preferable that $0.01 < L1/L2 \leq 1.75$ is satisfied, it is particularly preferable that $0.1 < L1/L2 \leq 1.70$ is satisfied. As a result, the movement of the small piece 4 through the gap G can be more effectively prevented or suppressed.

In addition, L1 is preferably 0.5 mm or more and 100 mm or less, and more preferably 1.0 mm or more and 70 mm or less. In addition, L2 is preferably 0.3 mm or more and 50 mm or less, and more preferably 0.5 mm or more and 40 mm or less.

As described above, the liquid absorber 100 of the present disclosure is provided with the ink absorbent body 10 as the liquid absorbent body configured to include the fiber base material 2 containing the fiber and the small piece aggregate including the plurality of small pieces 4 having the water absorbent resin 3, and the container 1 including the bottom portion 91 which is a wall portion defining the storage space 93 accommodating the ink absorbent body 10, four side wall portions 92, the lid 8, and the protrusion portion 71 provided to protrude from the wall portion into the storage space 93. In addition, when the minimum separation distance between the tip end 711 of the protrusion portion 71 and the structure different from the protrusion portion 71, in this embodiment, between the adjacent protrusion portions is L1, and the average value of the distance between the farthest ends of the small pieces 4 is L2, $0 < L1/L2 \leq 1.80$ is satisfied. According to the present disclosure, the liquid, that is, the ink Q can be made to permeate the entirety, and the unintended movement of the small pieces 4 in the container 1 can be effectively prevented or suppressed. As a result, the ink absorbent body 10 as a whole can exhibit excellent absorption characteristics without unevenness while sufficiently ensuring the permeability of the ink Q.

Second Embodiment

Figure 8:
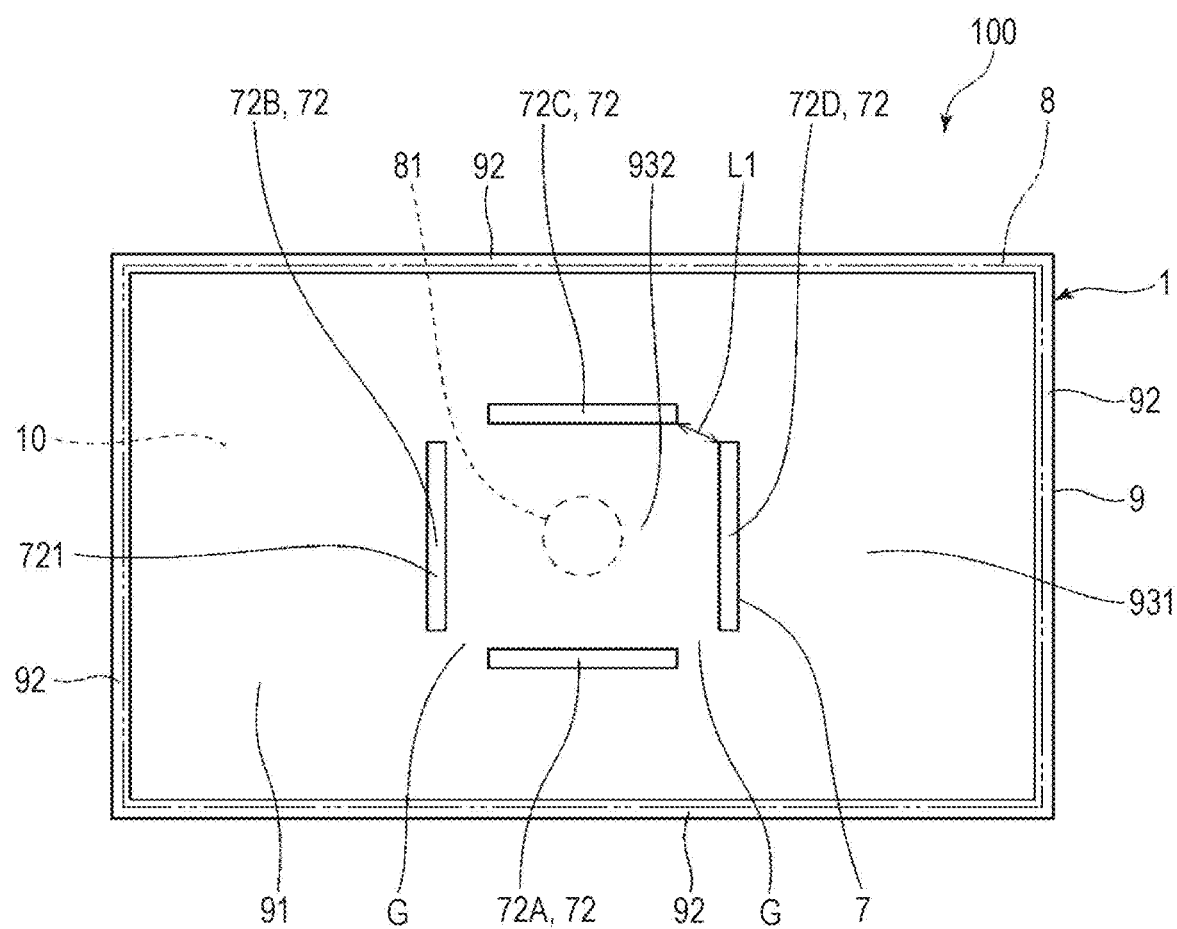
FIG. 8 is a view of a liquid absorber according to a second embodiment of the present disclosure when viewed from a lid side.
Figure 9:
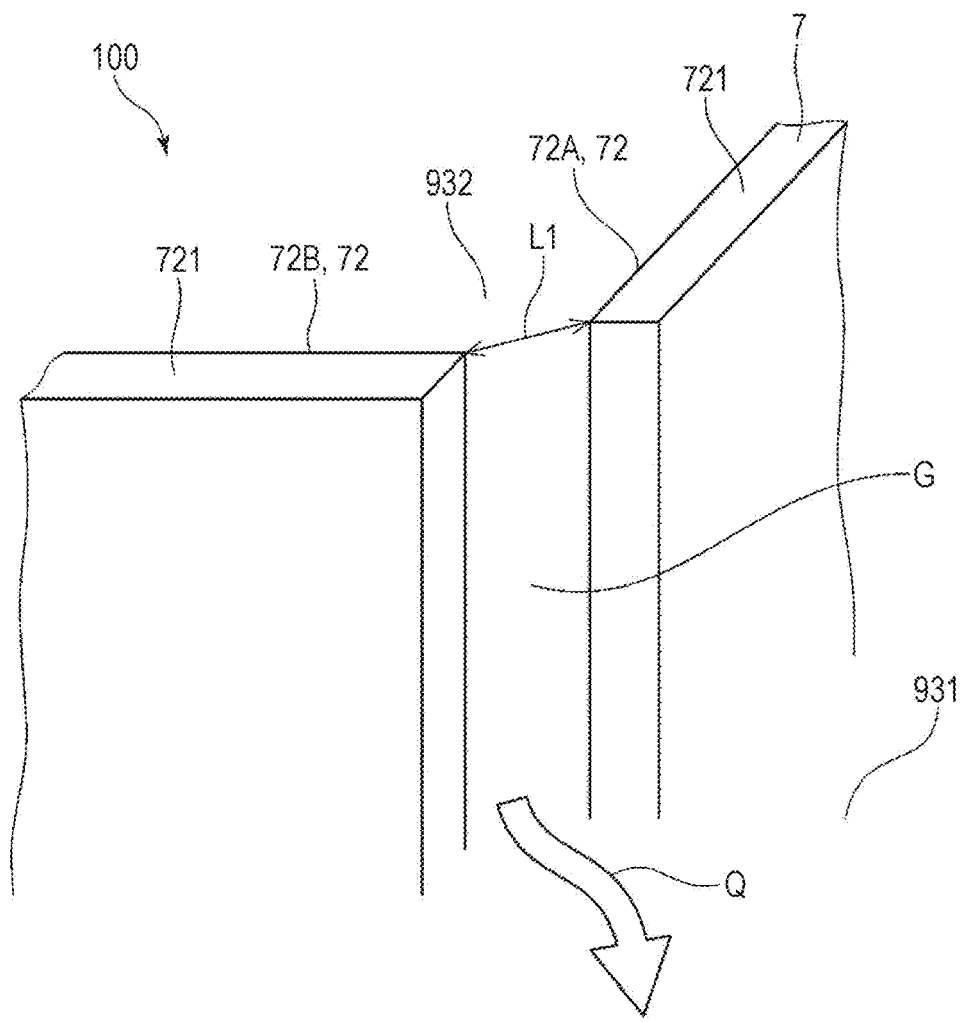
FIG. 9 is an enlarged perspective view of a protrusion portion illustrated in FIG. 8.

FIG. 8 is a view of a liquid absorber according to a second embodiment of the present disclosure when viewed from a lid side. FIG. 9 is an enlarged perspective view of a protrusion portion illustrated in FIG. 8.

Hereinafter, the second embodiment of the liquid absorber will be described with reference to these drawings, differences from the above-described embodiment will be mainly described, and the same matters will not be described.

This embodiment is the same as the first embodiment except that the configuration of the protrusion portion is different.

As illustrated in FIG. 8, in the present embodiment, the partition portion 7 includes four protrusion portions 72, that is, a protrusion portion 72A, a protrusion portion 72B, a protrusion portion 72C, and a protrusion portion 72D. Each of the protrusion portions 72A to 72D has a plate shape, and is provided to protrude from a surface of the bottom portion 91 facing the storage space 93, that is, a bottom surface 910. The protrusion portions 72A to 72D are provided separately from each other, and the gap G is formed between adjacent protrusion portions.

The protrusion portion 72A and the protrusion portion 72C are provided in parallel, and the protrusion portion 72B and the protrusion portion 72D are provided in parallel with a direction where the protrusion portions 72A and 72C face each other shifted by 90°.

In such a partition portion 7, as illustrated in FIG. 9, the separation distance between the tip ends of the adjacent protrusion portions 72, that is, the tip end surfaces 721 is the minimum separation distance.

Also in such an embodiment, when the minimum separation distance between the adjacent protrusion portions 72 is L1 and the average value of the distance between the farthest ends of the small pieces 4 is L2, 0<L1/L2≤1.80 is satisfied. As a result, the same effect as in the first embodiment described above can be obtained. Furthermore, since the total width of the gap G is smaller than that of the first embodiment, unintended movement of the small piece 4 can be more effectively prevented or suppressed.

Third Embodiment

Figure 10:
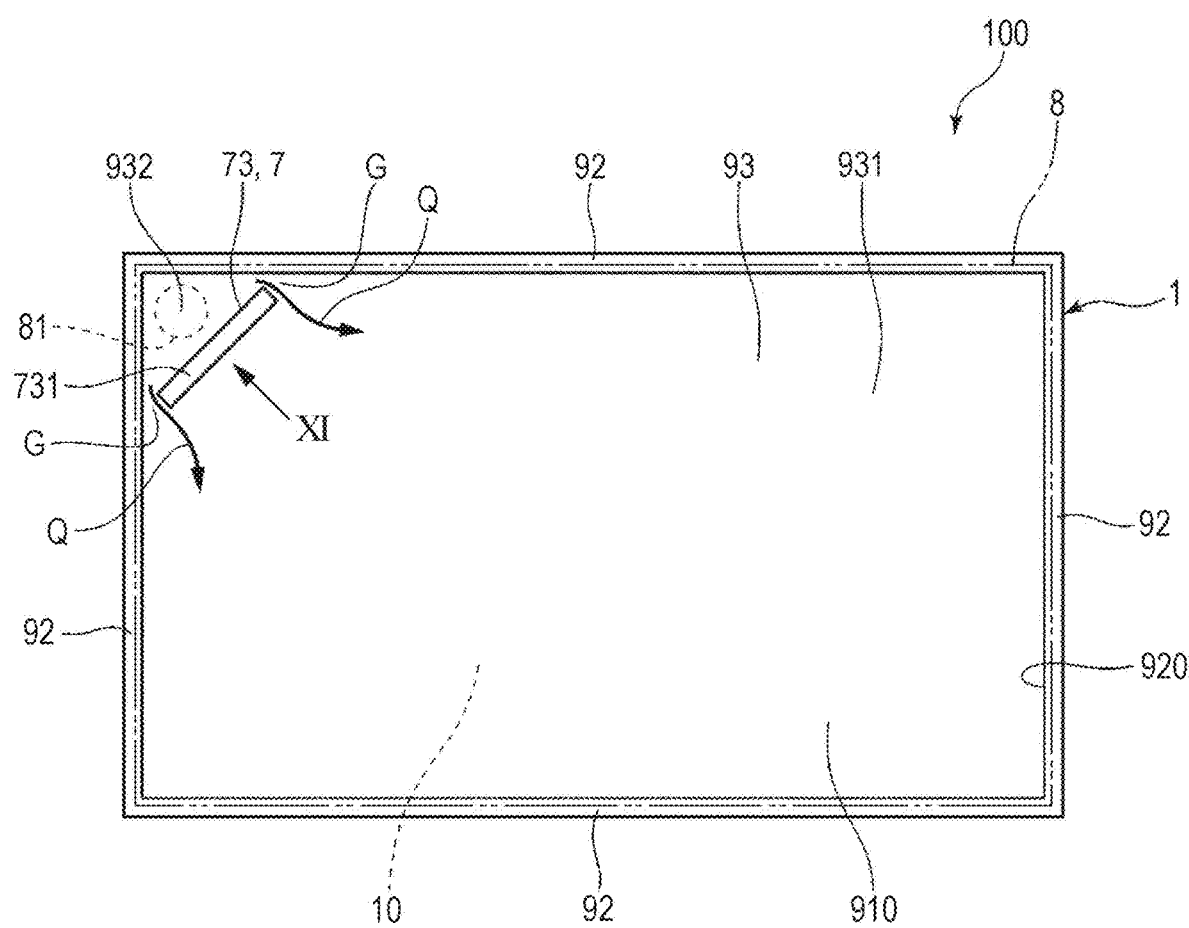
FIG. 10 is a view of a liquid absorber according to a third embodiment of the present disclosure when viewed from a lid side.
Figure 11:
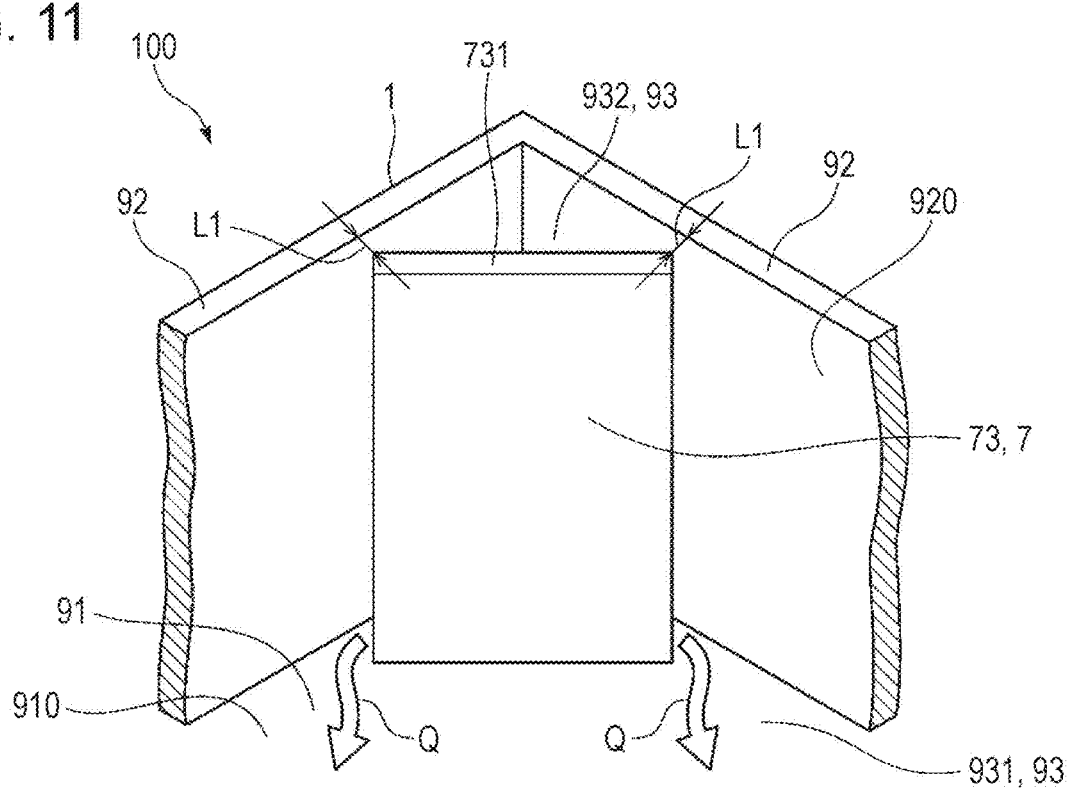
FIG. 11 is a view when viewed from a direction of arrow XI in FIG. 10.

FIG. 10 is a view of the third embodiment of a liquid absorber according to a third embodiment of the present disclosure when viewed from a lid side. FIG. 11 is a view viewed when viewed from a direction of arrow XI in FIG. 10.

Hereinafter, the third embodiment of the liquid absorber will be described with reference to these drawings, differences from the above-described embodiment will be mainly described, and the same matters will not be described.

This embodiment is the same as the first embodiment except that the configuration of the protrusion portion is different.

As illustrated in FIG. 10, in the present embodiment, the partition portion 7 has one protrusion portion 73. The protrusion portion 73 has a plate shape and is provided to protrude from a surface of the bottom portion 91 facing the storage space 93, that is, from the bottom surface 910. In addition, as illustrated in FIG. 10, the side of the protrusion portion 73 is inclined with respect to the adjacent side wall portion 92. Therefore, a space between the protrusion portion 73 and the side wall portion 92 forms a second storage space 932 which is a substantially triangular space when viewed from above. In addition, two gaps G are formed between the protrusion portion 73 and the adjacent side wall portion 92. In the present embodiment, the widths of the two gaps G are the same as each other.

In addition, in the present embodiment, the supply port 81 is located near the corner portion of the side wall portion 92 when viewed from the lid 8 side. That is, the supply port 81 overlaps the second storage space 932 when viewed from the lid 8 side. As a result, the ink Q supplied from the supply port 81 is first supplied to the second storage space 932 and is supplied to the outside of the second storage space 932 through the gap G, that is, to the first storage space 931.

In such a partition portion 7, as illustrated in FIG. 11, the separation distance between the tip ends of a protrusion portion 73, that is, a tip end surface 731 and an inside surface 920 of the side wall portion 92 is the minimum separation distance L1.

As described above, L1 is the distance between the tip end of the protrusion portion 73 and the side wall portion 92. As a result, the above-described effects of the present disclosure can be more reliably exerted even with the configuration as illustrated in the figure.

Also in such an embodiment, when the minimum separation distance between the protrusion portion 73 and the side wall portion 92 as an adjacent structure is L1 and the average value of the distance between the farthest ends of the small pieces 4 is L2, 0<L1/L2≤1.80 is satisfied. As a result, the same effect as in the first embodiment described above can be obtained. Furthermore, since the total width of the gap G is smaller than that of the first embodiment, unintended movement of the small piece 4 can be more effectively prevented or suppressed.

Modification Example 1

Figure 12:
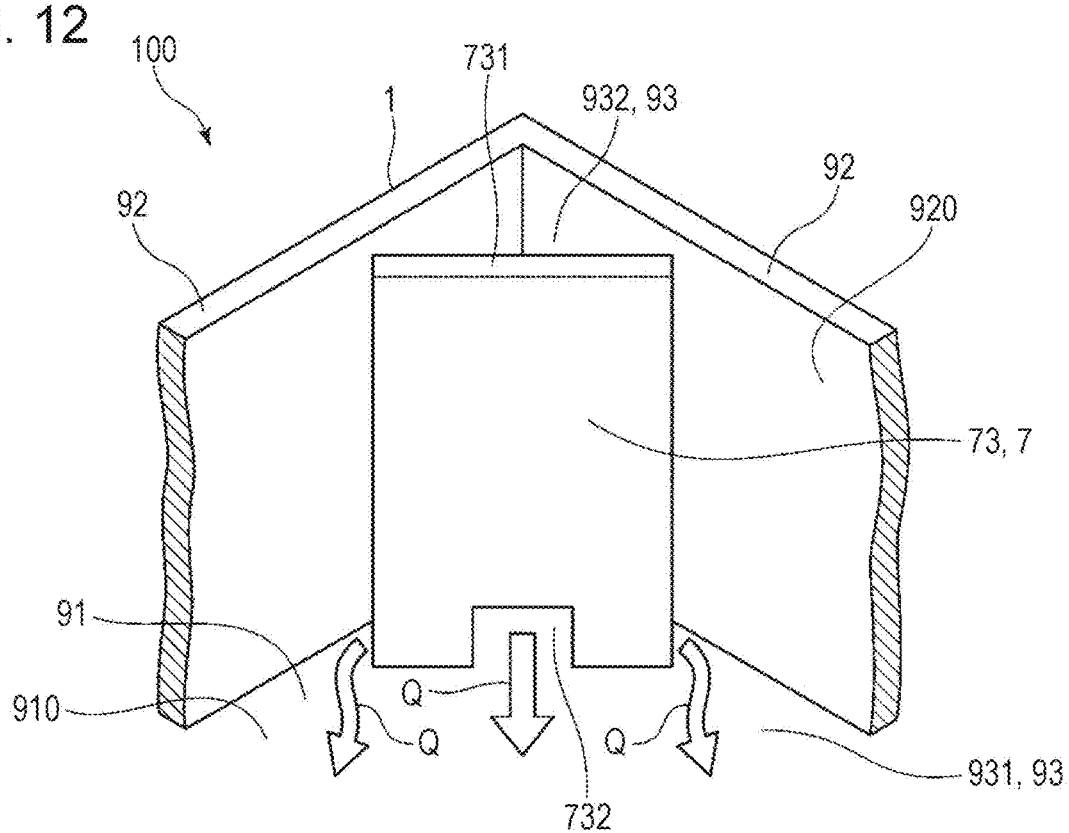
FIG. 12 is a perspective view illustrating a modification example of the protrusion portion illustrated in FIG. 11.

FIG. 12 is a perspective view illustrating a modification example of the protrusion portion illustrated in FIG. 11.

As illustrated in FIG. 12, the protrusion portion 73 has a notch 732 in which a portion of an edge portion on the bottom portion 91 side is cut out. In the illustrated configuration, the notch 732 is formed of a through-hole formed at a base of the protrusion portion 73, that is, at the central portion of the side of a base end portion. In Modification Example 1, the ink Q can easily flow out from the second storage space 932 to the first storage space 931 due to the formation of the notch 732. The shape of the notch 732 is not limited to the illustrated configuration.

Modification Example 2

Figure 13:
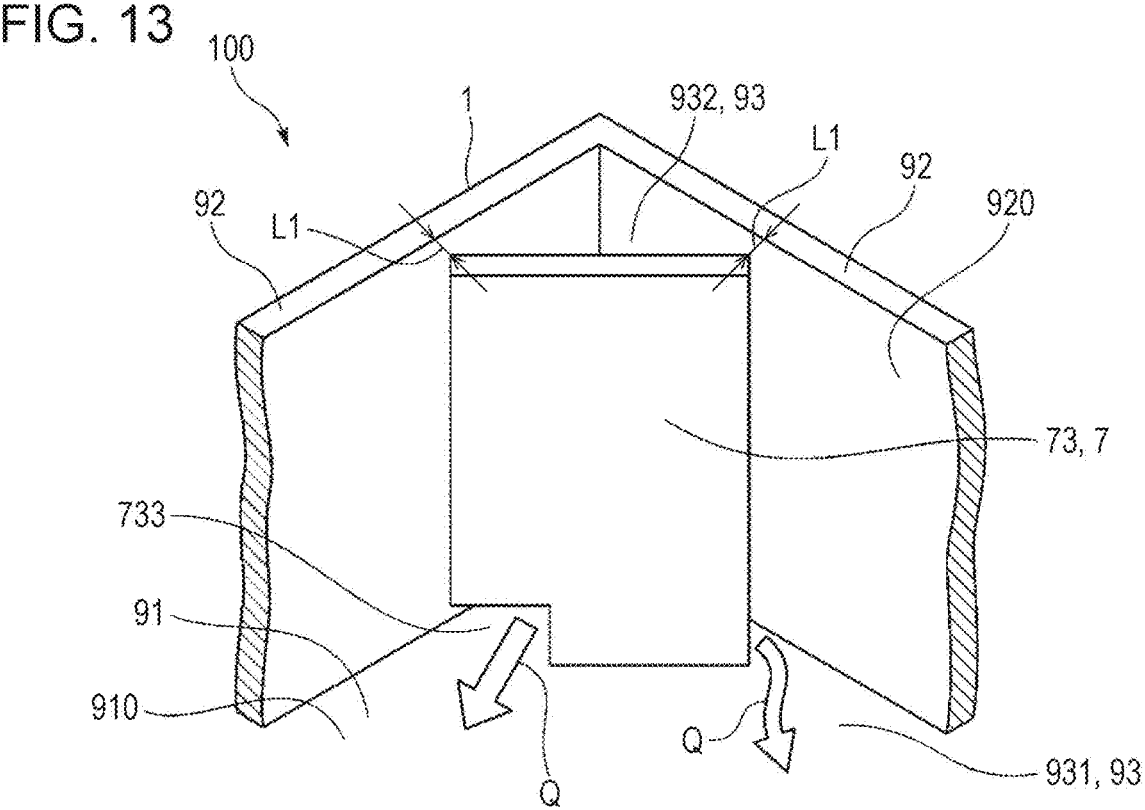
FIG. 13 is a perspective view illustrating a modification example of the protrusion portion illustrated in FIG. 11.

FIG. 13 is a perspective view illustrating a modification example of the protrusion portion illustrated in FIG. 11.

As illustrated in FIG. 13, the protrusion portion 73 has a notch 733 in which one corner portion on the bottom portion 91 side is cut out. In Modification Example 2, the ink Q can easily flow out from the second storage space 932 to the first storage space 931 due to the formation of the notch 733.

The configuration is not limited to the illustrated one, and both corner portions on the bottom portion 91 side may be cut out. That is, two notches 733 may be provided.

Modification Example 3

Figure 14:
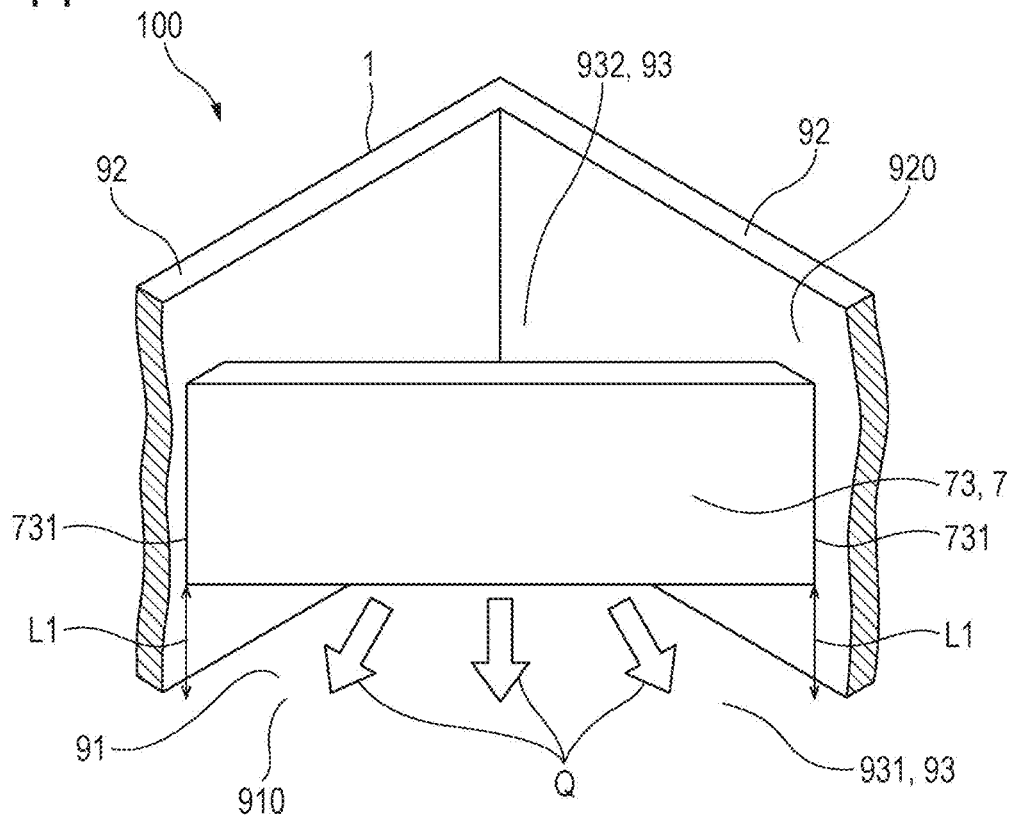
FIG. 14 is a perspective view illustrating a modification example of the protrusion portion illustrated in FIG. 11.

FIG. 14 is a perspective view illustrating a modification example of the protrusion portion illustrated in FIG. 11.

As illustrated in FIG. 14, the protrusion portion 73 is provided to protrude from the side wall portion 92 toward the adjacent side wall portion 92. In other words, it can be said that the protrusion portion 73 extends from the side wall portion 92 to the adjacent side wall portion 92. In addition, the protrusion portion 73 is provided separately from the bottom portion 91. In Modification Example 3, the tip end of the protrusion portion 73 refers to a boundary between the protrusion portion 73 and the side wall portion 92.

In addition, in Modification Example 3, the separation distance between the tip end surface 731 of the protrusion portion 73 and the bottom portion 91 is the minimum separation distance.

Also in such a Modification Example 3, when the minimum separation distance between the protrusion portion 73 and the bottom portion 91 which is the adjacent structure is L1 and the average value of the distance between the farthest ends of the small pieces 4 is L2, $0 < L1/L2 \leq 1.80$ is satisfied. As a result, the same effect as in the first embodiment described above can be obtained. Furthermore, in Modification Example 3, since the entire area of the protrusion portion 73 is separated from the bottom portion 91, the ink Q easily flows out from the second storage space 932 to the first storage space 931 along the bottom portion 91.

Hereinbefore, although the preferred embodiments of the present disclosure are described, the present disclosure is not limited to the above embodiments.

As described above, although the liquid absorber of the present disclosure is described based on the illustrated embodiment, the present disclosure is not limited thereto, and the configuration of each parts can be replaced with an any configuration having the same function. In addition, other any components may be added to the present disclosure. In addition, each of the embodiments may be appropriately combined.

Example

Next, specific examples of the present disclosure will be described.

In the following description, a treatment which does not indicate the temperature condition and the humidity condition is performed under the environment of a temperature of 25° C. and a relative humidity of 35%. In addition, various measurements are performed at a temperature of 25° C. and a relative humidity of 35% when the temperature condition and the humidity condition are not indicated.

1. Production of Test Liquid Absorber

Example 1

First, G80A4W manufactured by Toppan Forms Co., Ltd., which is a waste paper of length 30 cm, width 22 cm, thickness 0.5 mm, was prepared as a sheet shaped fiber base material. In addition, the weight of the paper was 4 g/one sheet.

Next, 2 g of pure water was applied to the entire surface of the waste paper from one surface side by spraying.

Next, SUNFRESH 500MPSA (manufactured by Sanyo Chemical Industries, Ltd.) as a polyacrylic acid polymer crosslinked product, which is a water absorbent resin having a carboxyl group as an acid group in a side chain, was applied from the surface side applied with pure water of the waste paper. At this time, the water absorbent resin was applied while passing through a sieve (JTS-200-45-106 manufactured by Tokyo Screen Co., Ltd.) having a mesh having an opening size of 0.106 mm. The application amount of the water absorbent resin per one waste paper was 3 g.

The waste paper was folded in half so that a valley was formed on the surface to which the water absorbent resin adhered. In this folded state, the sheet shaped fiber base material was pressurized and heated in the thickness direction using a pair of heating blocks. The pressurizing was performed at 0.15 kg/cm$^2$, and the heating temperature was 100° C. In addition, the heating and pressurizing time was 120 seconds.

The heating and pressurizing were released, the fiber base material left at room temperature for 12 hours. When the sheet shaped fiber base material was at room temperature, the sheet shaped fiber base material was cut into a strip having a width of 2 mm and a length of 15 mm using a shredder with a basic shred size of 2 mm×15 mm (SeCuret series F403S manufactured by Ishizawa Seisakusho Co., Ltd.) to obtain a plurality of small pieces of aggregate.

The content of the water absorbent resin in the small pieces was 75% by mass with respect to the fibers, and the average particle diameter of the water absorbent resin was 35 to 50 μm. In addition, in each of the small pieces, the water absorbent resin was impregnated into the fiber base material.

By cutting into small pieces with the multi-cut shredder in this manner, a liquid absorbent body formed of an aggregate of small pieces deformed into an amorphous shape due to a difference in shear force at the time of cutting or stress strain in the material piece was prepared.

The average value L2 of the distances between the farthest ends of the 16 small pieces extracted at random was 9.5 mm.

Next, two block shaped structure bodies as illustrated in the photographs in FIGS. 15 to 18 were prepared and disposed on a plane. At this time, the two structure bodies were disposed in parallel so as to be separated from each other by a certain distance. One plate member was disposed on the upper surface of each of the structure bodies so as to bridge the gap of each of the structure bodies. That is, the plate members were disposed such that one plate member was bridged on the upper surface of each of the structure bodies.

The separation distance of each of the structure bodies was regarded as the "minimum separation distance L1" described in the above embodiment. In Example 1, L1 was 14.25 mm.

The prepared liquid absorbent bodies were disposed with the weight and the bulk density illustrated in Table 1, respectively. At the time of this disposition, the liquid absorbent body was disposed on the plate member so as to be in a lump larger than the gap of each of the structure bodies, thereby obtaining a test liquid absorber.

Examples 2 to 6, and Comparative Examples 1 to 3

The test liquid absorbers of Examples 2 to 6 and Comparative Examples 1 to 3 were obtained in the same manner as in Example 1 except that the configuration, weight, bulk density, and L1 and L2 of the small pieces were as illustrated in Table 1.

2. Evaluation

Next, the plate member was pulled out such that the liquid absorbent body remained at that position. At this time, the plate member was pulled out with the other hand while holding down the liquid absorbent body lightly with one hand. The liquid absorbent body after the plate member was pulled out was visually confirmed and evaluated as follows.

A: No small pieces are dropped (refer to FIG. 15)
B: A small amount of small pieces are dropped, and the small piece aggregate is spread over the gap (refer to FIG. 16)
C: Small pieces are slightly dropped, and the small piece aggregates are hung in the horizontal direction and spread over the gap (refer to FIG. 17)
D: A lot of small pieces are dropped, and the small piece aggregate is not spread over the gap (refer to FIG. 18)

The results are illustrated in Table 1.

aggregate collapses, and the movement of the small pieces cannot be prevented or suppressed.

In addition, the same evaluation as described above was performed in a state containing various commercially available inks, and the same result was obtained in this case.

What is claimed is:

1. A liquid absorber comprising:
    a liquid absorbent body configured to include a piece aggregate including a plurality of pieces having a fiber base material containing a fiber and a water absorbent resin; and
    a container that includes
        a wall portion defining a storage space accommodating the liquid absorbent body and
        a protrusion portion provided to protrude from the wall portion toward the storage space, wherein
    $0 < L1/L2 \leq 1.80$, wherein L1 is a minimum separation distance between a tip end of the protrusion portion and a structure different from the protrusion portion, and L2 is an average value of a distance between farthest ends of a piece of the pieces.

2. The liquid absorber according to claim 1, wherein the protrusion portion is provided to protrude from a bottom surface of a container main body, the bottom surface facing the storage space.

3. The liquid absorber according to claim 2, wherein a height of the tip end of the protrusion portion from the bottom surface is 50% or more of a depth of the container main body.

4. The liquid absorber according to claim 1, wherein the protrusion portion is provided to protrude from a side surface of a container main body, the side surface facing the storage space.

TABLE 1

|  | Small piece size (mm) | Shape of small piece | Weight (g) | Bulk density (g/cm$^2$) | Carrying water absorbent resin | L1 (mm) | L2 (mm) | L1/L2 | Evaluation |
|---|---|---|---|---|---|---|---|---|---|
| Example 1 | 2 × 15 | Bending | 6 | 0.01 | Present | 14.25 | 9.5 | 1.5 | A |
| Example 2 | 2 × 15 | Bending | 6 | 0.01 | Present | 17.10 | 9.5 | 1.8 | B |
| Example 3 | 2 × 23 | No bending | 3 | 0.07 | Absent | 32.25 | 21.5 | 1.5 | A |
| Example 4 | 2 × 23 | No bending | 3 | 0.07 | Absent | 38.70 | 21.5 | 1.8 | B |
| Example 5 | 3 × 28 | No bending | 3 | 0.05 | Absent | 42.60 | 28.4 | 1.5 | A |
| Example 6 | 3 × 28 | No bending | 3 | 0.05 | Absent | 51.12 | 28.4 | 1.8 | B |
| Comparative Example 1 | 2 × 15 | Bending | 6 | 0.01 | Present | 19.00 | 9.5 | 2.0 | D |
| Comparative Example 2 | 2 × 23 | No bending | 3 | 0.07 | Absent | 43.00 | 21.5 | 2.0 | D |
| Comparative Example 3 | 3 × 28 | No bending | 3 | 0.05 | Absent | 56.80 | 28.4 | 2.0 | D |

Figure 15:
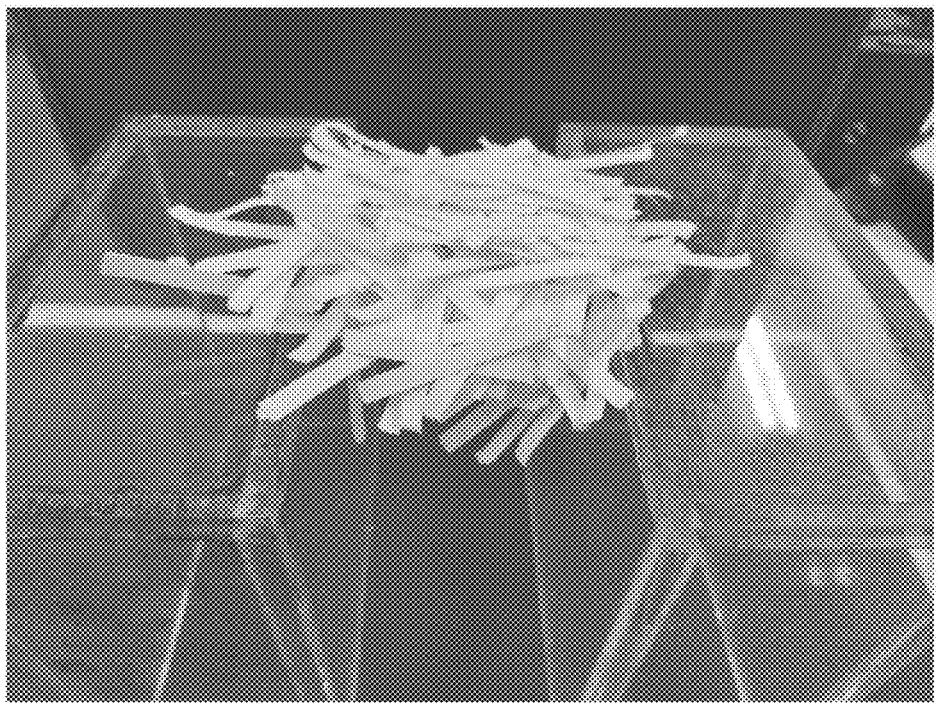
FIG. 15 is a photograph of a liquid absorbent body illustrating a state where a test is being performed.
Figure 16:
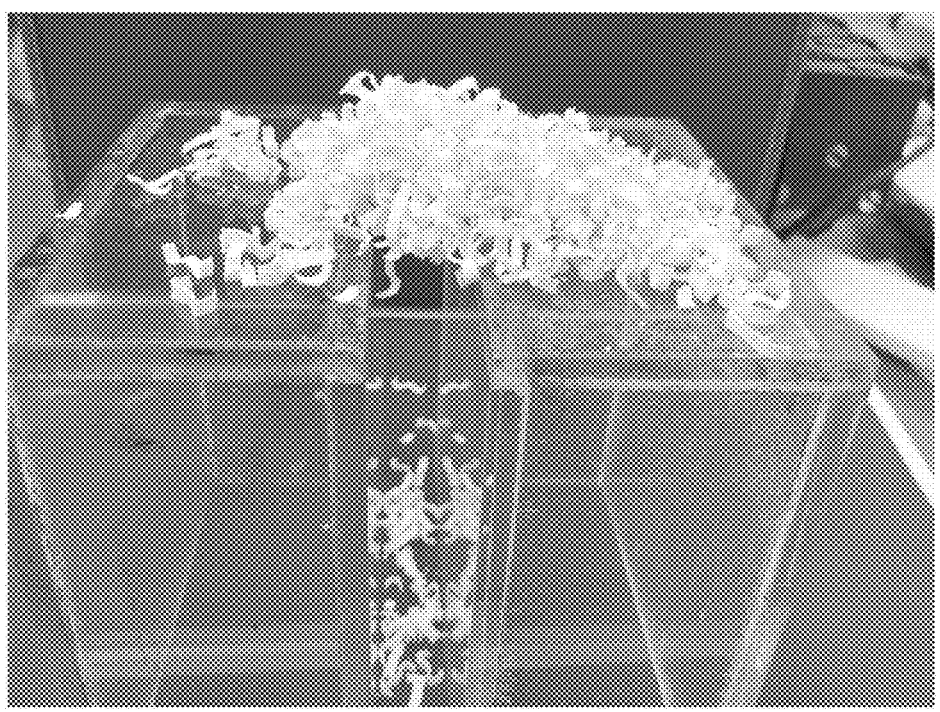
FIG. 16 is a photograph of the liquid absorbent body illustrating a state where a test is being performed.
Figure 17:
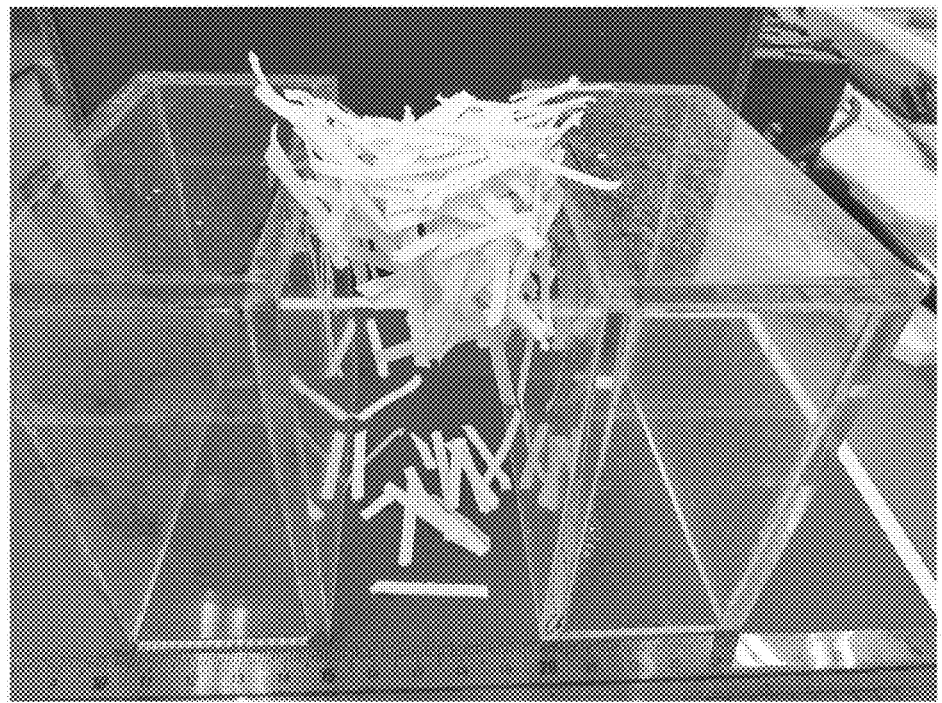
FIG. 17 is a photograph of the liquid absorbent body illustrating a state where a test is being performed.
Figure 18:
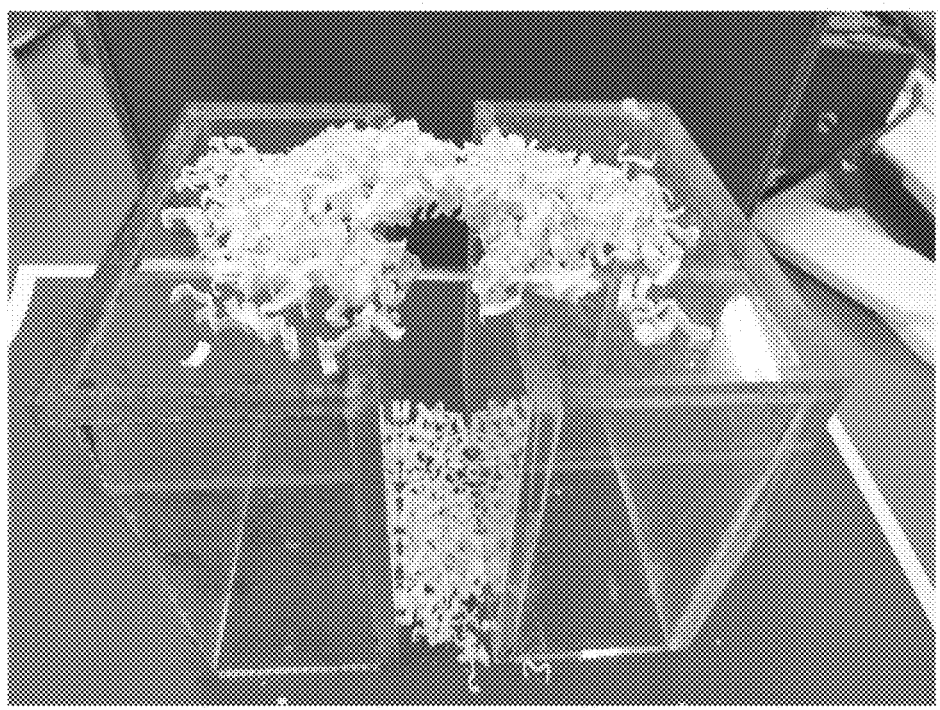
FIG. 18 is a photograph of the liquid absorbent body illustrating a state where a test is being performed.

As illustrated in Table 1 and FIGS. 15 to 17, satisfactory results were obtained for Examples 1 to 6 satisfying $0 < L1/L2 \leq 1.80$. In particular, Examples 1, 3, and 5, in which L1/L2 was 1.5, obtained particularly good evaluations. In addition, in Comparative Examples 1 to 3, which do not satisfy $0 < L1/L2 \leq 1.80$, as illustrated in FIG. 18, the small piece 5. The liquid absorber according to claim 1, wherein the container includes a partition portion that partitions the storage space into a first storage space and a second storage space, a filling density of the piece in the second storage space being lower than a filling density of the piece in the first storage space, and the partition portion is formed from one or more of each of a plurality of protrusion portions each of which is the protrusion portion arranged to separate the second storage space from the first storage space.

6. The liquid absorber according to claim 5, wherein the partition portion includes a communication portion through which a liquid passes between the first storage space and the second storage space.

7. The liquid absorber according to claim 5, wherein the container includes a supply portion that supplies a liquid to the second storage space.

8. The liquid absorber according to claim 1, wherein the container is provided with a plurality of protrusion portions, each of which is the protrusion portion provided to protrude from the wall portion toward the storage space, and
the L1 is a distance between tip ends of the protrusion portions adjacent to each other.

9. The liquid absorber according to claim 1, wherein the L1 is a distance between the tip end of the protrusion portion and the wall portion.

* * * * *